US007621668B2

(12) United States Patent
Littman et al.

(10) Patent No.: US 7,621,668 B2
(45) Date of Patent: Nov. 24, 2009

(54) METHODS AND APPARATUS FOR HANDLING OR TREATING PARTICULATE MATERIAL

(75) Inventors: Howard Littman, Niskayuna, NY (US); Joel L. Plawsky, Albany, NY (US); John D. Paccione, Voorheesville, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 0 days.

(21) Appl. No.: 11/567,100

(22) Filed: Dec. 5, 2006

(65) Prior Publication Data

US 2008/0130399 A1    Jun. 5, 2008

Related U.S. Application Data

(60) Provisional application No. 60/865,722, filed on Nov. 14, 2006, provisional application No. 60/868,468, filed on Dec. 4, 2006.

(51) Int. Cl.
*B01F 15/02* (2006.01)
*F27B 15/09* (2006.01)
*F27B 15/18* (2006.01)

(52) U.S. Cl. .................. 366/101; 366/132; 366/134; 422/145

(58) Field of Classification Search .......... 422/139, 422/145; 366/136, 270, 132, 134, 101; 406/141, 406/142, 143
See application file for complete search history.

(56) References Cited

U.S. PATENT DOCUMENTS

| 233,847 | A | * | 11/1880 | Groom | 209/142 |
|---|---|---|---|---|---|
| 431,313 | A | * | 7/1890 | Ballard | 209/139.1 |
| 2,687,331 | A | | 8/1954 | Seaman | |
| 2,806,744 | A | * | 9/1957 | Hall et al. | 366/101 |
| 2,826,460 | A | | 3/1958 | Cameron et al. | |
| 3,179,378 | A | | 4/1965 | Zenz et al. | |
| 3,312,342 | A | * | 4/1967 | Brown | 209/138 |
| 3,494,217 | A | * | 2/1970 | Tanaka et al. | 209/138 |

(Continued)

OTHER PUBLICATIONS

Littman, H., et al., "Effect of Large Particles on the Augmentation of Wall Friction in Vertical Pneumatic and Hydraulic Transport in a Tubulent Fluid." Ind. Eng. Chem. Res., vol. 46, 2007, pp. 3429-3442.

(Continued)

*Primary Examiner*—Tony G Soohoo
(74) *Attorney, Agent, or Firm*—Heslin Rothenberg Farley & Mesiti P.C.

(57) ABSTRACT

An improved draft tube spout fluid bed (DTSFB) mixing, handling, conveying, and treating apparatus and systems, and methods for operating are provided. The apparatus and systems can accept particulate material and pneumatically or hydraulically conveying the material to mix and/or treat the material. In addition to conveying apparatus, a collection and separation apparatus adapted to receive the conveyed particulate material is also provided. The collection apparatus may include an impaction plate against which the conveyed material is directed to improve mixing and/or treatment. The improved apparatus are characterized by means of controlling the operation of the pneumatic or hydraulic transfer to enhance the mixing and/or reacting by controlling the flow of fluids, for example, air, into and out of the apparatus. The disclosed apparatus may be used to mix particulate material, for example, mortar; react fluids with particulate material; coat particulate material, or simply convey particulate material.

26 Claims, 7 Drawing Sheets

U.S. PATENT DOCUMENTS

| | | | | |
|---|---|---|---|---|
| 3,976,331 | A | * | 8/1976 | Kluger et al. ............... 406/15 |
| 4,042,220 | A | * | 8/1977 | Humkey et al. ............ 366/101 |
| 4,153,304 | A | * | 5/1979 | Haskins ..................... 406/138 |
| 4,373,272 | A | | 2/1983 | Jones et al. |
| 4,502,819 | A | * | 3/1985 | Fujii et al. ................... 406/14 |
| 4,566,596 | A | | 1/1986 | Hennig |
| 4,569,596 | A | * | 2/1986 | Romanchik et al. ......... 366/107 |
| 4,792,235 | A | * | 12/1988 | Paul ........................... 366/107 |
| 4,834,544 | A | | 5/1989 | Paul |
| 5,018,869 | A | * | 5/1991 | Paul ........................... 366/101 |
| 5,145,253 | A | * | 9/1992 | Paul et al. ................... 366/101 |
| 5,152,604 | A | | 10/1992 | Paul |
| 5,244,317 | A | | 9/1993 | Kuboyama et al. |
| 5,248,222 | A | * | 9/1993 | Littman et al. .............. 406/142 |
| 5,254,168 | A | * | 10/1993 | Littman et al. .............. 118/666 |
| 5,749,684 | A | * | 5/1998 | Horn Feja .................. 406/141 |
| 5,752,327 | A | * | 5/1998 | Biallas et al. ................ 34/359 |
| 6,315,965 | B1 | * | 11/2001 | Horn Feja et al. ........... 422/232 |
| 6,936,142 | B2 | * | 8/2005 | Hradil et al. ................ 204/222 |

OTHER PUBLICATIONS

Park, K.-B., et al. "Mortar Properties Obtained by Dry Premixing of Cementitious Materials and Sand in a Spout-Fluid Bed Mixer." Cement and Concrete Research, vol. 36, 2006, pp. 728-734.

Plawsky, J.L. et al. "Exploring the Effect of Dry Premixing of Sand and Cement on the Mechanical Properties of Mortar." Cement and Concrete Research, vol. 33, 2003, pp. 255-264.

Littman, Howard. "State of Development of the Draft Tube Spout-Fluid Bed Contactor for Large Particles." J. Serb. Chem. Soc., vol. 61, 1996, pp. 211-231.

Povrenovic, D.S. "Fluidmechanical Characteristics and Stability of a Large Diameter Spout-Fluid Bed with a Draft Tube." J. Serb. Chem. Soc., vol. 61, 1996, pp. 355-365.

Littman, H., et al. "Effect of Particle Diameter, Particle Density and Loading Ratio on the Effective Drag Coefficient in Steady Turbulent Gas-Solids Transport." Powder Technology, vol. 84, 1995, pp. 49-56.

Littman, H., et al. "Modeling and Measurement of the Effective Drag Coefficient in Decelerating and Non-Accelerating Turbulent Gas-Solids Dilute Phase Flow of Large Particles in a Vertical Transport Pipe." Powder Technology, vol. 77, 1993, pp. 267-283.

Ferreira, et al. "Fluid Dynamics Characterization of a Pneumatic Bed Using a Spouted Bed Type Solid Feeding System." The Canadian Journal of Chemical Engineering, vol. 70, Oct. 1992, pp. 905-909.

Nitta, B.V., et al. "Particle Circulation and Liquid Bypassing in Three Phase Draft Tubed Spouted Beds." Chemical Engineering Science, vol. 47, 1992, pp. 3459-3466.

Grbavcic, R.V., et al., "Variational Model for Prediction of the Fluid-Particle Interphase Drag Coefficient and Particulate Expansion of Fluidized and Sedimenting Beds." Powder Technology, vol. 68, 1991, pp. 199-211.

Stocker, Rudolf K., et al. "Hydrodynamic and Thermal Modelling of a High Temperature Spouted Bed Reactor With a Draft Tube." The Canadian Journal of Chemical Engineering, vol. 68, Apr. 1990, pp. 302-310.

Muir, James R., et al., "Solids Circulation in a Spout-Fluid Bed with Draft Tube." Chemical Engineering Comm., vol. 88, 1990, pp. 153-171.

Berruti, Franco, et al.. "Solids Circulation in a Spout-Fluid Bed with Draft Tube." The Canadian Journal of Chemical Engineering, vol. 66, Dec. 1988, pp. 919-923.

Matthew, Mani C., et al. "Study of the Hydrodynamics Within a Draft Tube Spouted Bed System." The Canadian Journal of Chemical Engineering, vol. 66, Dec. 1988, pp. 908-918.

Morgan, M.H., et al. "Jet Penetration and Pressure Drops in Water Spouted Beds of Fine Particles." The Canadian Journal of Chemical Engineering, vol. 66, Oct. 1988, pp. 735-739.

Yang, Wen-Ching, et al. "Studies on the Solid Circulation Rate and Gas Bypassing in Spouted Fluid-Bed with a Draft Tube." The Canadian Journal of Chemical Engineering, vol. 61, Jun. 1983, pp. 349-355.

Yang, Wen-Ching, et al. "Solid Entrainment Rate into Gas and Gas-Solid, Two-Phase Jets in a Fluidized Bed" Powder Technology, vol. 33, 1982, pp. 89-94.

* cited by examiner

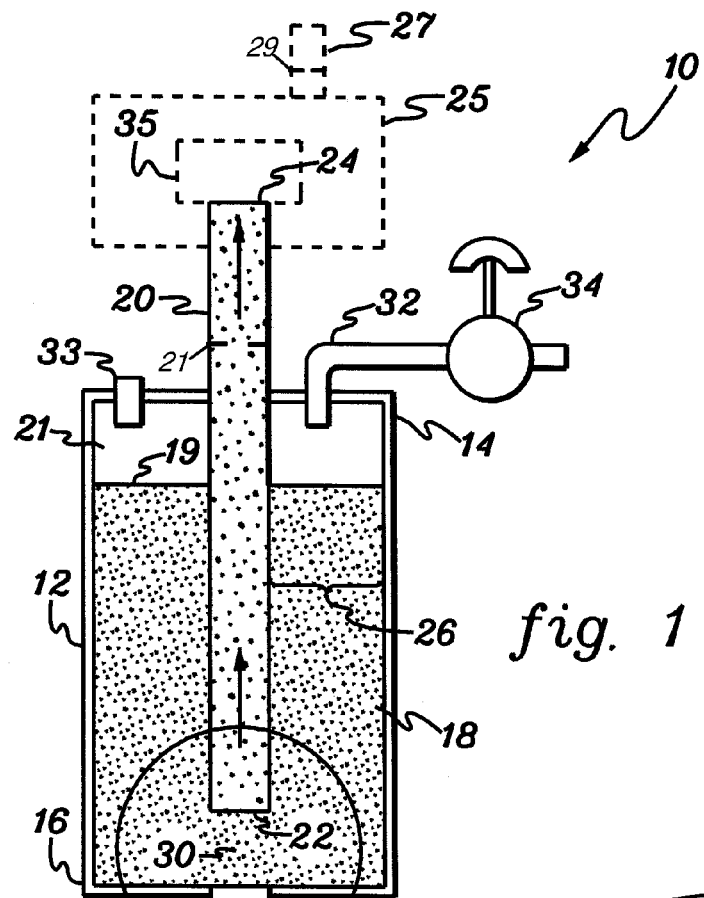
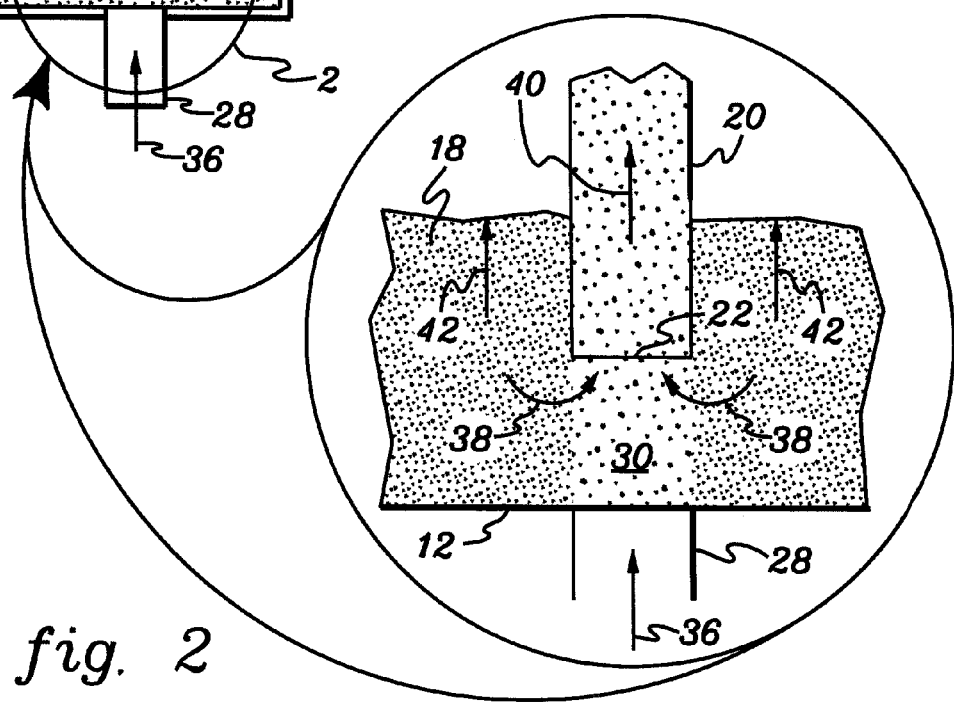
fig. 1
fig. 2

METHODS AND APPARATUS FOR HANDLING OR TREATING PARTICULATE MATERIAL

CROSS REFERENCES TO RELATED APPLICATIONS

This application is related to commonly-assigned, U.S. provisional application 60/865,722 filed Nov. 14, 2006 and 60/868,468 filed Dec. 4, 2006, the disclosures of which are hereby incorporated by reference herein.

STATE AND FEDERAL FUNDED RESEARCH

The invention described herein was made with New York State support under State Grant Number C010331 from the New York State Department of Transportation. The State of New York may have certain rights to this invention.

The invention described herein was also made with support of the National Aeronautics and Space Administration (NASA) under Federal Grant Number NNM05AA04A. The U.S. Government may have certain rights to this invention.

TECHNICAL FIELD

This invention relates, generally, to systems, methods, and apparatus for controlling and handling particulate material, for example, for mixing and treating particulate material. More particularly, the present invention provides improved draft tube spout fluid bed (DTSFB) material handling methods and apparatus having improved controllability and performance.

BACKGROUND OF THE INVENTION

In many industries, the blending of particulate material, for example, powders is often critical to the performance or desired characteristics of the resulting product, for example, the blending of powders to make concrete, the blending of pharmaceuticals, the blending of food ingredients, or the blending of ceramics, among other products. However, the blending equipment typically used to blend these and other particulate materials typically have the disadvantages of producing lack of uniform particle distribution in the product, sensitivity to particle size, and the excess generation and loss of fine particles (or "fines") in the product. Aspects of the present invention employ pressurized fluid flows through conduits, for example, "draft tubes," to mix, treat, coat, and otherwise handle particulate materials.

One prior art type of particulate mixer is known as a "pneumatic blender." Pneumatic blenders are similar to fluidized bed mixers in that they use air or a gas to agitate the granular or particulate material to produce a particle mixture. Pneumatic mixers are effective for blending products that do not require uniform particle distribution. For example, pneumatic blenders are typically not used for mixing pharmaceuticals that typically require a somewhat uniform particle distribution in the resulting product. Pneumatic blenders are effective for blending component particles that are similar in size, density, and shape. Pneumatic blenders are, however, highly scalable and can be used to blend particles of vastly differing size and shape. One disadvantage of pneumatic blenders is that they typically carry off the finer particles from the mixture and, as such, need some form of filtration device, or "bag house," downstream of the blender to prevent air pollution or loss of product.

Another prior art mixing device is a "convection-type blender." Convection blenders include ribbon, plow paddle, and conical orbiting screw mixers, among others. A convention paddle blender is similar to the type of mixer used for blending ingredients for a cake. Typically, paddle mixers produce high shear in the particulate or powder during blending. One disadvantage of the paddle blender is that areas of stagnation can occur where the material fails to mix properly or remains unmixed, for example, in regions near the wall of the container in which the particles are mixed. Other disadvantages of convection mixers include the poor blending of mixtures where at least one component is very dilute. Also, convection blenders are recognized in the art as poor blenders of powders that are very dense or very abrasive. Convection blenders are also typically difficult to clean, are difficult to scale up due to their power requirements, provide inconsistent product, and can be characterized by excessive wear due to abrasion.

Another prior art particulate blending device is the "diffusion-type blender." Diffusion blenders operate by allowing the particles to be blended to move with respect to each other by moving the actual containment vessel itself. Diffusion blenders are often called "tumble blenders" because they resemble a container that is tumbled in some fashion. Diffusion blenders can accommodate particles that are vastly different in size, density, and total concentration. These systems are easily scaled to huge sizes and can be customized to accommodate different types of materials.

Aspects of the present invention overcome many of the disadvantages of the prior art blending, mixing, and treating devices while providing improved blending, mixing, and treatment of particulate material One industry that can benefit from aspects of the present invention is the mortar or cement industry. The need to produce roads and bridges with concrete structures and surfaces that are stronger, more durable, and less costly to maintain is imperative. To improve the performance of concretes in these structures, recent compositions have included fly ash and condensed silica fume. These materials increase the strength of concrete, reduce its permeability, and have the potential to decrease cracking through improvements in the paste aggregate bond.

However, most of these fine particles, particularly the silica fume, exist in the form of fine spheres linked together into clusters, rather than as isolated spheres [St. John, et al. (1995)]. The performance gains from using materials like silica fume are primarily related to the chemical reaction between calcium hydroxide and the fine material, and secondarily due to the improved particle packing density resulting from the uniform incorporation of finer and finer particles into the mix [Lange, et al. (1997) and Chengzhi, et al. (1996)]. Diamond, et al. (2004) point out that most silica fume used in concrete is in the dry, densified form and consists of agglomerates of sizes between 10 μm and several millimeters. Lagerblad, et al. (1995) have reported that granulated condensed silica fume is not easily dispersed. In conventionally mixed concrete, the breakdown of densified silica fume agglomerates is incomplete and a portion of the agglomerates remains at least partly intact. Undispersed agglomerates in mortars and concretes result in poor performance gains due to the inability of the finest size fraction of the particles to effectively enter the interfacial transition zone.

Dispersing fine particles in cement is normally achieved in the liquid phase using surfactants known as superplasticizers [Hooton, et al. (1998)]. These admixtures have long been used to help disperse the cementitious powder but the dispersive action occurs only after water is added and the 'polymerization' (hydration and micro-crystalline interlocking) reactions begin [Anderson, et al. (1988 and Ferraris, et al. (1992)]. Scrivener (1989) reported that despite the use of superplasticizer, some clumps of silica fume are still present and so the material is not used as efficiently as it could be.

Another approach to providing better dispersion of the agglomerates is to take advantage of the recent advances in dry-phase processing techniques [Iwasaki, et al. (2001)]. These techniques provide the means to transform the mechanical properties of the cement by dispersing the powder uniformly in very small clumps prior to hydration. The addition of fine particles in coarser ones improves the fluidization characteristics of the coarser material [Haberko (1979)] by dispersing fines into the voids between the larger particles and reducing the channeling and bubbling of the fluidizing gas [Matsumoto, et al. (1986)]. The mixture prevents a cohesive powder such as cement from behaving as a 'weak' solid, held together by chemical and electrostatic forces. Without the addition of the large particles, the powder would crack causing channeling of the gas to take place, rather than aeration and mixing of the particles [Kendall, et al. (2001)].

The inventors surmise that a dry mechanical dispersion of powders should lead to a more uniform mixture with smaller clumps of material and would serve as a precursor to chemical dispersants, such as superplasticizers, allowing the dispersants to work more effectively, since the diffusion length required to get to the center of a particle clump will be reduced. Unfortunately, conventional concrete or mortar mixing equipment cannot provide the intensity of agitation necessary to effectively mix and disperse the finest particles [Ferraris, et al. (2001)]. Thus, obtaining a uniform mixture of these components is generally difficult, inhibiting performance gains and increasing the cost of the materials. Further, the inventors surmise that the dry premixing process, if executed correctly, should be able to produce mortars with properties comparable to the best, high-shear rotary mixers, but at much higher throughputs than are possible with rotary mixers alone.

The "draft tube spout fluid bed" (DTSFB) mixer is also known as an effective mixing device. Littman (1996) summarized the state of development of the DTSFB mixer. U.S. Pat. Nos. 5,248,222 and 5,254,168, both of Littman (one of the co-inventors of the present invention), et al. (the disclosures of which are included by reference herein) disclose advancements in the particulate mixing art that can be achieved with the DTSFB mixer.

Plawsky, et al. (2003) reported that the dry premixing of sand and cement using a first-generation, DTSFB mixer was more effective as the cement content was reduced and that it might be possible to produce commercially acceptable mortar with lower cement content. However, a considerable amount of cement fines passed through the cyclone separator of Plawsky, et al. (2003) and ended up, unincorporated, in a bag house filter unit. Due to this loss, the early strength gain of the initial mixtures was slower than the control samples even though the long-term strengths of the dry, premixed and control samples were comparable. The inventors now surmise that the loss of fine particles may significantly affect mortar performance particularly when ultrafine particles, such as fly ash and silica fume powders, are added to the mixture. In an attempt to avoid the disadvantages of this and other prior art, for example, to insure more complete incorporation of all materials, the inventors designed, tested, and developed the present invention in its many aspects.

Aspects of the present invention overcome the above disadvantages and other disadvantages of prior art particulate material blending devices.

SUMMARY OF THE INVENTION

Aspects of the present invention provide methods and apparatus for handling, treating, and otherwise proceeding particulate material. For example, in one aspect, a method and apparatus are provided for blending powders using different mechanics than the blending systems discussed above. Because the mechanical mixing processes are different, it is to be expected that the resulting blends would possess different characteristics. From an industrial point of view, aspects of the invention are easily scaled up from very small units to very large units in a very predictable manner. Aspects of the invention are based on two main components, namely, a pneumatic/hydraulic mixing device (which may be similar to the DTSFB mixer discussed above) and a particle separation and collection device, such as, a "bag house" commonly used for air pollution control and solids recovery. However, the inventors have improved on the prior art systems to provide a more advantageous design. The DTSFB has been studied, developed, characterized, and quantified by, for example, as described in U.S. Pat. No. 5,248,222 (the disclosure of which is incorporated by reference herein). Filtering devices, such as, bag houses, are known in the industry.

Aspects of the present invention were first reported by Park, et al, (2005) in which a second generation DTSFB mixer was designed and tested. (The disclosure of Park, et al. (2005) is also included by reference herein.) The DTSFB disclosed by Park, et al, was found to be more reliable, versatile and easier to operate than the first generation mixer disclosed by Plawsky, et al. (2003). For example, Park, et al. disclosed in their investigation that they were able to reduce the amount of cement in mortars while still producing commercially acceptable compressive strengths in mortars as well as higher tensile strength, determined that the premixing process results in less shrinkage, and incorporated other cementitious materials, such as, fly ash and silica fume to produce a high performance mortar blend. However, only after the submission of Park, et al. for publication did the present inventors discover the inherent deficiencies of the device disclosed in Park, et al. Specifically, with further investigation, the present inventors discovered that in the device disclosed by Park, et al. it is difficult, if not impossible, to control the flow conditions within the draft tube. The inventors addressed this limitation in the device of Park, et al., as well as the other prior art, with aspects of the present invention.

In addition to mixing, aspects of the invention include methods and apparatus for handling and treating (including reacting) particulate material. One aspect of the invention is a particulate material handling apparatus including a vessel having a top and a bottom, the vessel adapted to contain a particulate material; a vertically extending conduit having an inlet in the vessel and an outlet; a fluid inlet in the bottom of the vessel, the fluid inlet directed toward the inlet of the vertically extending conduit wherein a pressurized fluid introduced there through produces a flow of at least some of the particulate material and fluid through the vertically extending conduit; a fluid outlet from the vessel; and means for controlling the pressure drop across the vertically extending conduit to thereby regulate the flow of the particulate material through the vertically extending conduit. The apparatus may further comprise at least one second fluid inlet directed into the bottom of the vessel. In one aspect, the apparatus comprises a particulate material reactor, and wherein the fluid inlet introduces a fluid reactant that reacts with at least some of the particulate material. In one aspect, parameter of the flow of the particulate material and fluid though the vertically extending conduit may be particle flow velocity, fluid flow velocity, solids fraction, voidage, or a combination thereof.

Another aspect is a method for handling particulate material including introducing the particulate material to a vessel having a top and a bottom, a vertically extending conduit having an inlet in the vessel and an outlet outside of the vessel, a fluid inlet at the bottom directed toward the inlet of the vertically extending conduit, and a fluid outlet; introducing a flow of fluid into the fluid inlet and producing a flow of at least some of the particulate material and fluid through the vertically extending conduit; and controlling the pressure drop across the vertically extending conduit to regulate the flow of the particulate material through the vertically extending conduit. In one aspect, the method comprises a particulate material treatment method, and wherein introducing a flow of fluid into the fluid inlet comprises introducing the flow of treatment fluid to the inlet, and wherein the method further comprises treating at least some of the particulate material with the treatment fluid. In another aspect, the method comprises a method of coating the particulate material, and wherein introducing a flow of fluid into the fluid inlet comprises introducing the flow of a fluid to the inlet adapted to coat the particulate material, and wherein the method further coating at least some of the particulate material with the fluid. In another aspect, the coating fluid may be introduced as a spray by means of a nozzle positioned at the outlet of the vertically extending conduit (that is, at the outlet of the draft tube).

Another aspect of the invention is a method of mixing a first particulate material with at least a second particulate material, the method including introducing the first particulate material and at least the second particulate material to a first vessel; pneumatically or hydraulically conveying at least some of the first particulate material and at least some of the second particulate material from the first vessel through a conduit to produce a stream of at least some first particulate material and at least some second particulate material in the conduit; discharging the stream from an open end of the conduit, the open end of the conduit having a central axis; and impacting the stream discharged from the open end of the conduit against a surface (for example, an "impaction plate") in a second vessel to provide a mixture first particulate material and second particulate material in the second vessel, the surface in the second vessel positioned substantially perpendicular to the central axis of the open end of the conduit.

A further aspect of the invention is a particulate material mixing device including a first vessel adapted to receive a first particulate material and at least a second particulate material; at least one conduit having an open first end and an open second end, the open second end having a central axis; means for conveying at least some of the first particulate material and at least some of the second particulate material from the first vessel into the open first end of the conduit and out the open second end of the conduit in a stream of material; a second vessel positioned to receive the stream of material from the open second end of the conduit; and a surface (for example, an "impaction plate") in the second vessel, the surface oriented substantially perpendicular to the central axis of the open second end of the conduit and positioned to receive and deflect the stream of material and provide a mixture of the first particulate material and at least the second particulate material in the second vessel.

A still further aspect of the invention is a method of manufacturing a binder material for use in fabricating a mortar, the method including introducing sand and at least cement to a first vessel; pneumatically conveying at least some of the sand and at least some of the cement from the first vessel through a conduit to produce a stream of material in the conduit; discharging the stream from an open end of the conduit, the open end of the conduit having a central axis; and impacting the stream discharged from the open end of the conduit against a surface in a second vessel to provide the binder material comprising the sand and the cement in the second vessel, the surface in the second vessel positioned substantially perpendicular to the central axis of the open end of the conduit.

These and other aspects, features, and advantages of this invention will become apparent from the following detailed description of the various aspects of the invention taken in conjunction with the accompanying drawings.

BRIEF DESCRIPTION OF THE FIGURES

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 1 is a schematic diagram, in cross-section, of a particulate material handling apparatus according to one aspect of the invention.

FIG. 2 is a detailed schematic diagram of the lower section of the apparatus shown in FIG. 1 as identified by detail 2 in FIG. 1.

DETAILED DESCRIPTION OF THE FIGURES

Figure 3:
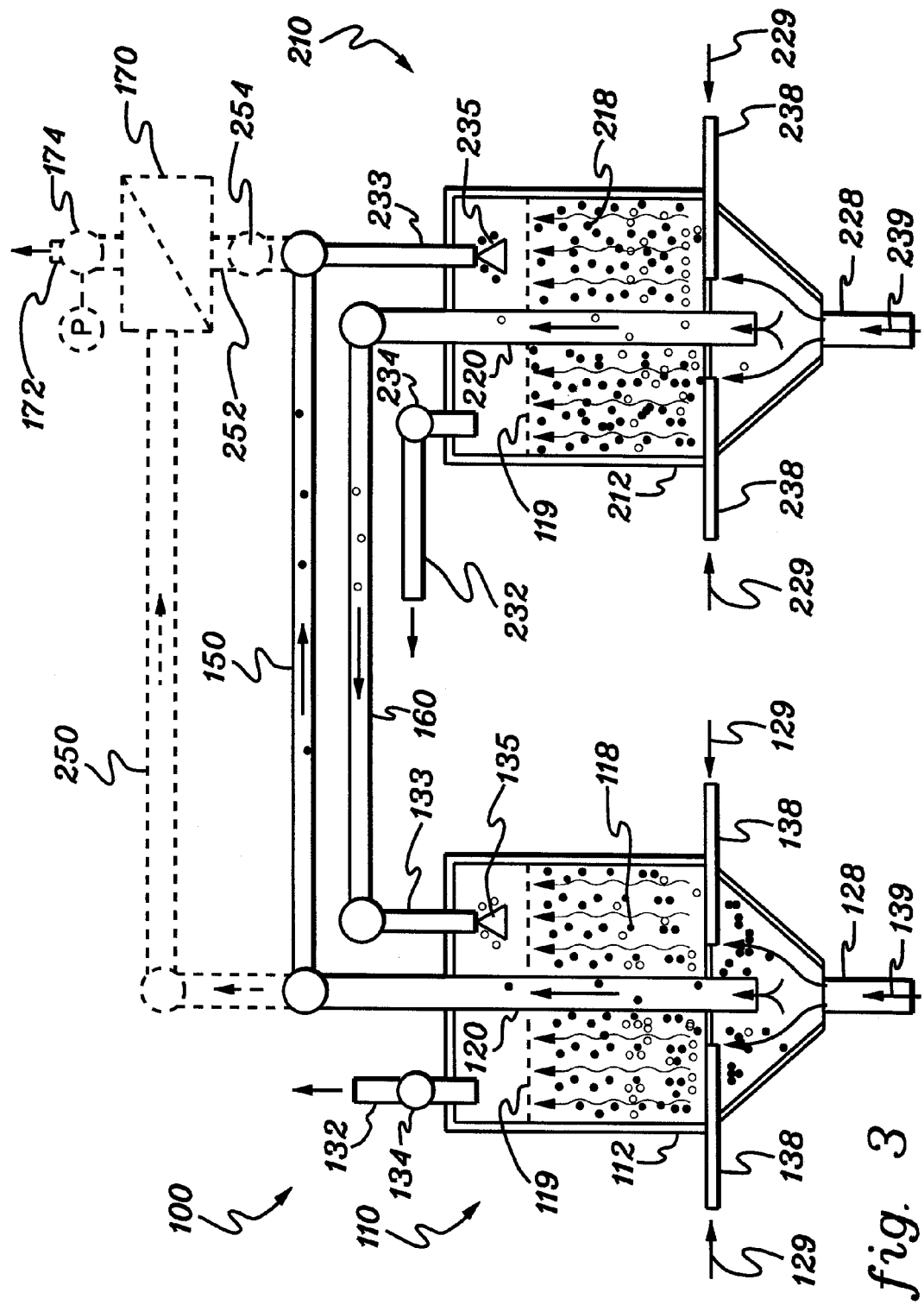
FIG. 3 is a schematic diagram, in cross-section, of system having two or more of the apparatus shown in FIG. 1 operated in conjunction, according to an aspect of the invention.

Aspects of the present invention may be utilized to handle and treat particulate material in a broad range of applications. For example, aspects of the invention may be used for, but are not limited to, mixing particulate material, treating particulate material, coating particulate material, and simply transporting particulate material, among other handling and treating that are recognizable by those of skill in the art.

FIG. 1 is a schematic diagram, in cross-section, of a particulate material handling apparatus 10 according to one aspect of the invention. Apparatus 10 includes a vessel 12, for example, a circular cylindrical vessel, though any non-circular or non-cylindrical vessel may be used, as appropriate. Vessel 12 includes a closed top 14 and a closed bottom 16 and, according to aspects of the invention, contains particulate material 18. Particulate material 18 may include any particulate material, for example, a powder, pellets, beads, chips, chunks, and the like, which may be metallic or non-metallic, for example, sand, stone, pharmaceuticals, saw dust, wood chips, food particles, ceramics, porous material, catalysts, catalytic materials, absorbents, adsorbents, ion exchange resins, and the like. In one aspect, particulate material 18 may comprise a plurality of particulate materials, for examples, materials intended to be mixed by apparatus 10, for instance, sand and cement. In one aspect, particulate material 18 may comprise a material having sufficient voidage, that is, space between particles, when placed in vessel 12 that a fluid, for example, a gas or liquid, may be passed through particulate material 18. Particulate material 18 may form a level of material 19, below top 14 of vessel 12 whereby a void space 21 is provided in top 14 of vessel 12, for example, an annular void space. Void space 21 may provide a plenum into which fluid passes after passing through material 18 prior to, for example, exiting vessel 12.

According to aspects of the invention, vessel 12 of apparatus 10 includes at least one conduit, pipe, or tube 20 (which may be referred to in the art as a "draft tube") having an open first end 22 positioned inside vessel 12 and an open second end 24 positioned outside or inside of vessel 12. Conduit 20 may typically be directed vertically within vessel 12, as shown in FIG. 1; however, conduit 20 may be oriented at any angle, that is, an angle from the vertical, while effecting the function described in this specification and attached claims. Optionally, the open second end 24 of conduit 20 may be located in a second vessel 25 (shown in phantom in FIG. 1). A typical second vessel 25 that may be used in aspects of the invention is described and discussed with respect to FIG. 5 below, though any vessel which is adapted to collect particulate material may be used. Conduit 20 may have any convenient cross-section, for example, circular, oval, or rectangular, but is typically circular in cross section. In one aspect, conduit 20 may be directed substantially vertically in vessel 12 whereby conduit 20 forms an annular region 26 in vessel 12 between the outside of conduit 20 and the inside of vessel 12.

Vessel 12 includes at least one fluid inlet 28 positioned in the bottom 16 of vessel 12 for receiving a fluid 36 (that is, a liquid or gas) and at least one fluid outlet 32 positioned in top 14 of vessel 12. Fluid 36 may be a multiphase fluid, for example, a fluid containing a liquid and solids, a fluid containing a liquid and a gas, a fluid containing a gas and solids, or a fluid containing a liquid, a gas, and solids. It will be understood by those in the art, that the multiphase fluid may contain one or more liquids, one or more gases, or one or more different solids depending upon the treatment to be performed in vessel 12. For example, in one aspect, fluid 36 may be a mixture of contaminated water and hydrogen gas that can catalytically treat the water to remove contaminants, such as trichloroethylene. Vessel 12 may also include at least one inlet 33, for example, positioned in top 14, for instance, for introducing particulate material 18 to vessel 12. Inlet 28 comprises a conduit having a fluid outlet 30 directed toward inlet 22 of conduit 20. According to aspects of the invention, inlet 28 is so positioned whereby fluid introduced to inlet 28 and directed toward inlet 22 of conduit 20 produces a flow of at least some of particulate material 18 and fluid through the conduit 20. Due to the typical expansion of fluid flow as the fluid leaves inlet 28, the diameter of inlet 28 may be smaller than the diameter of inlet 22. Also, the spacing of inlet 28 from inlet 22 may be varied, for example, the elevation of inlet 28 may be varied, for instance, depending upon the nature of the particulate material 18. As will be discussed below, in some aspects of the invention, the flow of fluid through inlet 28 may be augmented by one or more additional fluid inlets.

According to aspects of the invention, the outlet 32 may include some means 34 for regulating or controlling the flow of fluid through outlet 32. Outlet 32 may be a conduit and means 34 may be a valve, for example, a ball, a needle, a globe, or gate valve. In aspects of the invention, means 34 controls the flow of fluid from outlet 32 whereby at least one parameter of the flow of particulate material 18 and fluid though the conduit 20 is varied. For example, varying the flow through outlet 32 may vary particle flow velocity, fluid flow velocity, voidage, or a combination of two or more of these parameters. In one aspect of the invention, vessel 12 may include at least one means 35 for controlling the pressure drop across conduit 20. Contrary to prior art device, for example, the device disclosed by Plawsky, et al., by controlling or regulating the pressure drop across conduit 20, aspects of the present invention permit the operator to regulate or control the flow of the particulate material through conduit 20, for example, to control the flow regime in conduit 20 or control the solids fraction of the particulate material flowing through conduit 20. In FIG. 1, means 35 is illustrated schematically for reference only; however, in aspects of the invention, a pressure drop across conduit 20 may be controlled by mean of a restriction 21 in conduit 20 or a restriction down stream of conduit 20, for example, a restriction in optional vessel 25 or a restriction 29 in a conduit 27 leading from vessel 25, such as, a valve. The controlling of the pressure drop across conduit 20 may be practiced by controlling or regulating the pressure in vessel 12, by controlling or regulating the pressure in optional vessel 25, or both. Further means for monitoring this pressure drop will be discussed below.

FIG. 2 is a detailed schematic diagram of the lower section of the apparatus 10 shown in FIG. 1 as identified by Detail 2 in FIG. 1. According to aspects of the invention, as a fluid, for example, a gas or a liquid, is introduced to vessel 12 through inlet 28, as indicated by arrow 36, the fluid enters vessel 12 and entrains at least some of particulate material 18 into open end 22 of conduit 20, as indicated by arrows 38, and entrains particulate material 18 through conduit 20, as indicated by arrow 40. As described in, for example, U.S. Pat. No. 5,248,222, the introduction of a pressurized fluid, typically, air (though other gases or liquids may be used), into inlet 28 (and/or other inlets as described below) agitates and/or entrains the particulate material 18 above inlet 28 whereby particulate material 18 will flow like a fluid. In one aspect of the invention, this agitation and/or aeration of particulate material is referred to as "fluidization," whereby a normally solid particulate material 18 is induced to behave somewhat like a fluid under the influence of the fluid introduced to inlet 28. The fluidization of the particulate material and the consequent creation of a pressure differential between the open end 22 and open end 24 of conduit 20 promotes the flow of the aerated particulate material 18 from open end 22, through conduit 20, and out of open end 24.

In some aspects of the invention, at least some of the fluid introduced through inlet 28 may also pass through particulate material 18 in annulus 26, as indicated by arrows 42, and exit vessel 12 through outlet 32. Thus, according to aspects of the invention, apparatus 10 may comprise an apparatus for handling or transporting particulate material 18 through conduit 20; an apparatus for treating particulate material 18 with a fluid 36, that is, for treating particulate material 18 in conduit 20, in annulus 26, or a combination thereof; an apparatus for mixing one or more particulate materials; or a combination thereof. However, unlike prior art apparatus, apparatus 10 according to aspects of the present invention, the nature of the flow of material in conduit 20 and annulus 26 may be moderated and controlled, for example, by manipulating the valve 34 in outlet 32 or by manipulating the pressure drop across conduit 20. As will be discussed further below, the pressure drop across conduit 20 may be varied in numerous ways according to the invention, for example, by introducing a restriction to conduit 20; by introducing a restriction to a down stream flow, for example, by means of a pressure control element, such as, a valve; or by providing a vessel downstream of conduit 20, for example, a vessel in which pressure is regulated. In one aspect of the invention, the concentration of the solid particles 18 transferred through conduit 20 may be regulated and/or controlled by regulating and/or controlling the pressure drop across conduit 20, for example, by manipulating a valve in an outlet from a downstream vessel.

Apparatus 10 shown in FIGS. 1 and 2, with or without means 35 for controlling the pressure drop across conduit 20, may be used to handle, treat, and/or react particulate material 18 or for handling, treating, or reacting fluid 36. For example, apparatus 10 may comprise a mixing apparatus for mixing two or more materials, as will be discussed below. Apparatus 10 may also comprise a treatment apparatus, for example, an apparatus for treating the fluid introduced to inlet 28 with the particulate material 18, for instance, hydrocarbon cracking, ion exchange, or $SO_2$ stripping, or for treating the particulate material 18 with the fluid introduced to inlet 28, for example, for steam stripping or regeneration of an ion exchange resin. Apparatus 10 shown in FIGS. 1 and 2, with or without means 35 for controlling the pressure drop across conduit 20, may be used to execute a chemical or physical reaction, for example, a reaction that particulate material 18 may or may not take part in, for example, may or may not catalyze, using at least part of the fluid streams 36 entering through inlet 28 (or auxiliary inlets discussed below). A chemical or physical reaction may take place in the annular region 26, or in conduit 20, or both in region 26 and in conduit 20. A reaction may also take place in down stream vessel 25. Particulate material 18 may return at least in part through inlet 33 after residence in vessel 25, for example, where a physical or chemical reaction may have taken place prior to return through inlet 33, though all the material 18 passed to vessel 25 may be returned to vessel 12. Typical chemical or physical reactions that may be practiced in vessel 12 may include, but are not limited to, catalytic oil cracking, protein separations, particle mixing, and particle coating, among others.

According to aspects of the invention, particulate material 18 may comprise one or more particulate materials, such as sand and cement, that when aerated and transported through conduit 20 are at least partially mixed to provide a mixture of particulate material discharged from open end 24 of conduit 20. For example, during transport through conduit 20, the inventors surmise that the turbulent eddies generated in conduit 20 provide shearing forces that overcome particle surface effects, such as van der Waals forces and electrostatic forces that hold individual particles in clumps, to break up clusters and clumps of particulate material and provide a more uniformly mixed material. In another aspect of the invention, apparatus 10 may comprise a coating apparatus by which the particulate material 18 may be coated with a material introduced to inlet 28 or present in annulus 26, while transported through conduit 20.

FIG. 3 is a schematic diagram, in cross-section, of a system 100 having two apparatus 110 and 210, which may be similar to apparatus 10 shown in FIG. 1, operated in conjunction according to an aspect of the invention. Similar to the structure and operation of apparatus 10, apparatus 110 includes a vessel 112 having a substantially vertical conduit 120, one or more inlets 128 and 138, one or more outlets 132, one or more inlets 133, a control valve 134, and containing particulate material 118. Inlets 138 (and inlets 238 below) may be simply open conduits discharging to vessel 112 or may comprise a conduit having a plurality of holes or orifices adapted to direct fluid 129 away from inlet 128, for example, upward, away from inlet 128. Also similar to the structure and operation of apparatus 10, apparatus 210 includes a vessel 212 having a substantially vertical conduit 220, one or more inlets 228 and 238, one or more outlets 232, one or more inlets 233, a control valve 234, and containing particulate material 218. As is typical of aspects of the invention, apparatus 110 and 210 may include means for controlling the pressure drop across the vertically extending conduits 120, 220 to thereby regulate the flow of the particulate material through the vertically extending conduit, for example, control valves 134 and 234, respectively. The position of inlets 138 and 238 may vary depending upon the treatment being performed, but inlets 138 and 238 are typically positioned toward the bottom of vessels 112 and 212, respectively. In the aspect of the invention shown, conduit 120 of apparatus 110 is in fluid communication with inlet 233 of apparatus 220, for example, via conduit 150. Also, conduit 220 of apparatus 210 is in fluid communication with inlet 133 of apparatus 120, for example, via conduit 160. According to one aspect of the invention, system 100 may comprise a chemical treatment or processing system, for example, a counter-current chemical treatment or processing system.

In one aspect, the flow of fluid 139 and 239 in FIG. 3 (and of fluid 36 in FIG. 1) may be adapted to fluidize particulate material 118 and 218 (and 18), respectively, residing in the annular region between conduits 120 and 220 (and 20) and the inside diameter of vessels 112 and 212 (and 12), respectively, whereby either particulate fluidization or aggregate fluidization occurs. As is known in the art, particulate fluidization is characterized by bed expansion while aggregate fluidization is characterized by bubbling.

With reference to FIG. 3, a fluid 129 (for example, a liquid, a gas, or a multiphase fluid) may be introduced to inlets 138 and be passed through particulate material 118, for example, while treating particulate material 118 or being treated by particulate material 118, and then passed out of outlet 132. At essentially the same time, particulate material 118 flows toward the inlet of conduit 120 and is entrained by fluid 139 introduced via inlet 128 and transferred through conduit 120, through conduit 150 to inlet 233 of vessel 212. Also, for example, at substantially the same time, a similar process is being performed in apparatus 210. Specifically, a fluid 229 (for example, a liquid, a gas, or a multiphase fluid) may be introduced to inlets 238 of vessel 212 and passed through particulate material 218, for example, while treating particulate material 218 or being treated by particulate material 218, and then passed out of outlet 232. At essentially the same time, particulate material 218 flows toward the inlet of conduit 220 and is entrained by fluid 239 introduced via inlet 228 and transferred through conduit 220, through conduit 160 to inlet 133 of vessel 112. As shown in FIG. 3, inlets 133 may include a baffle plate 135, 235, respectively, to deflect the incoming particulate material to more generally distribute the material more evenly in the respective vessels. As a result, in one aspect, a counter-current flow of material 118 and fluid 129 is provided in vessel 112, for example, wherein material 118 flows downward and fluid 129 flows upward, and a counter-current flow of material 218 and fluid 229 is provided in vessel 212, for example, wherein material 218 flows downward and fluid 229 flows upward. According to aspects of the invention, various chemical treatments may be practiced effectively in system 100. One or more subsequent apparatus, 10, 110, 120, may also be provided upstream of apparatus 110 or downstream of apparatus 210.

In one aspect, particulate material 118 and 218 may be replenished, for example, continuously, whereby a level 119 and 219 of material 118 and 218, respectively, is substantially maintained in vessels 112 and 212 during treatment. In another aspect, materials 118 and 218 may not be replenished whereby levels 119 and 219 may drop in elevation during treatment.

In one aspect, system 100 may include one or more fluid particle separating devices 170, shown in phantom in FIG. 3, adapted to separate particulate material from liquid or gas while the material and fluid are being conveyed between vessels 112 and 212. For example, as shown in FIG. 3, instead of passing through conduit 150, the particulate material and fluid discharged from draft tube 120 may be passed through conduit 250 to separating device 170 to, for example, limit the amount of fluid forwarded to vessel 212. Separating device 170 may be any device adapted to isolated particulate material from a liquid or gas, for example, separating device 170 may be a screening device having a screening medium, a settling chamber, a hydrocyclone, a charged surface (for collecting charged particles), an electric field or magnet, or any other conventional device adapted to isolate the particles flowing between vessel 112 and vessel 212. As shown in FIG. 3, separating device 170 may receive a flow of particulate material from conduit 250, isolate at least some of the particulate material, and forward the separated particulate material, possibly with some fluid, to conduit 252 and then to inlet 233 of vessel 212. Conduit 252 may include a flow control device 254, for example, a knife gate valve, to regulate the flow of particle material to vessel 212. The fluid separated by separation device 170 may be passed through conduit 172 for further treatment, re-use, or disposal. In one aspect, the separated fluid in conduit 172 may be returned for reintroduction through conduits 128, 138, 228, or 238, if desired, for example, after treatment. Conduit 172 may typically include a pressure-regulating device 174 adapted to regulate the pressure of the fluid discharged from separating device 170. Similarly, a separating device 170 may also be positioned in conduit 160 to treat the fluid and particulate material passing from vessel 212 to vessel 112. In one aspect, separating device 170 may be positioned in vessel 112 and/or vessel 212.

In one aspect of the invention, system 100 may be used for chemical extraction or concentration, for example, the extraction and concentration of metals from mine tailings, or the extraction of undesirable components, such as, heavy metals from waste water streams, and the like. For example, system 100 may be used to extract or concentrate a metal from a metal-laden stream. Specifically, system 100 may be used to extract copper from a copper-laden stream, for example, by varying the pH in vessels 112 and 212. Vessel 112 may be filled with resin beads, having an affinity for copper, to an elevation 119. A copper laden stream (for example, containing $Cu^{++}$ ions) may be introduced to one or more inlets 138 as fluid 129 (the stream may a relatively low concentration of copper and include other metals and non-metals) and pass upward through resin beads 118, for example, ion-exchange resin beads. The $Cu^{++}$ laden stream 129 may be introduced at a first pH, for example, a pH greater than 6. As the copper-laden fluid 129 encounters the resin beads 118, the $Cu^{++}$ deposits on the beads in a conventional manner. As the fluid 129 continues to flow upward through the resin 118, the $Cu^{++}$ in fluid 129 is depleted while the concentration of $Cu^{++}$ on the resin increases. According to aspects of the invention, while fluid 129 flows upward, resin beads 118 flow downward toward the inlet of conduit 120. As a result, the concentration of the $Cu^{++}$ in fluid 129 is least at level 119 and the concentration of $Cu^{++}$ on the resin beads 118 is greatest at or near the inlet of conduit 120. According to this aspect of the invention, the $Cu^{++}$ depleted fluid 129 may be discharged from outlet 132 and forwarded to storage, reuse, or further treatment, for example, to a similar apparatus 100 for extraction of another metal or non-metal.

Typically, at substantially the same time, the $Cu^{++}$ enriched beads 118 may be transferred by fluid 139 via conduit 120 through conduit 150 and inlet 233 of vessel 212. Fluid 139 may further treat $Cu^{++}$-laden resin beads 118, for example, by comprising a second pH, for example, different from the first pH, typically, less than a pH of 8. Fluid 139 may also simply be water, wherein little or no reactions take place in conduits 120 and 150.

The treatment practiced in vessel 212 may strip the copper from the resin beads producing a concentrated copper stream and refurbished resin beads, with little or no copper, that can be returned to vessel 112 for re-use. According to this aspect, an acidic fluid, for example, having a pH less than 7, but typically 6 or less, may be introduced to inlets 238 of apparatus 210 as fluid 229. In a flow pattern similar that practiced in vessel 112, the $Cu^{++}$ laden resin beads introduced to inlet 233 become particulate material 218 flowing downward in vessel 212 toward the inlet of conduit 220. As the $Cu^{++}$-laden beads flow downward, the acidic fluid 229 flows upward stripping the $Cu^{++}$ from the resin 218. As a result, due to this counter-current treatment in vessel 212, the concentration of the $Cu^{++}$ in fluid 229 is greatest at level 219 and the concentration of $Cu^{++}$ on the resin beads 118 is least at or near the inlet of conduit 220, where they can be transferred through conduit 220 by fluid 239 introduced via inlet 228. According to this aspect of the invention, the $Cu^{++}$ rich fluid 229 may be discharged from outlet 232 and forwarded to storage, reuse, or further treatment. Resin beads 218, having little or no $Cu^{++}$, may be returned to vessel 112 via conduits 220 and 160 and inlet 133. Again, Fluid 139 may further treat the $Cu^{++}$-depleted resin beads 218, or fluid 139 may simply be water, wherein little or no reactions take place in conduits 220 and 160. According to this aspect of the invention, metals and non-metals may be recovered or concentrated as desired by varying the conditions, for example, pH, temperature, and/or pressure within vessels 112 and 212.

In another aspect of the invention, system 100 may be used for treating fluid 129 with a catalyst or reagent, for example, fluid 129 may comprise a fluid hydrocarbon, such as a high-molecular-weight oil, and particles 118 may comprise a catalyst, for example, a zeolite-based catalyst. As the hydrocarbon fluid 129 passes through the catalyst particles 118, the catalyst particles 118 may become coked, poisoned, spent, or otherwise deactivated, rendering the catalyst no longer capable of reacting with, that is, catalyzing, fluid 129. This deactivation of particles 118 reduces their catalytic activity and selectivity or inhibits some reagent from reacting with a component of fluid 129. When the deactivated particulate material 118, for example, the spent catalyst, reaches the bottom of vessel 112, the spent catalyst 118 may be entrained with fluid 139 and passed through conduits 120 and 150 to vessel 212 and treated and recovered, for example, stripped of the residual hydrocarbons, coke, or other deactivating agent(s) and then regenerated, for example, with an oxygen-containing gas as fluid 229 in vessel 212, such as, air or another appropriate agent that removes or reverses at least some of the deactivating agents or conditions from the particulate material 218. The regenerated or reactivated catalyst or reagent may then be transferred from vessel 212 via conduits 220 and 160 and reintroduced to vessel 112, for example, via inlet 133, for further treatment participation in the reaction occurring in vessel 112. Similarly, system 100 may be used to perform hydrocracking and steam reforming of hydrocarbon fluids. System 100 of FIG. 3 may provide enhanced treatment or reacting of reagents since the flow regimes in vessels 112 and 212 are typically counter-current. As a result, the reagents or precursors 129, 229 introduced via conduits 138, 238 flow away from and are typically isolated from the reagents or precursors 139, 239 introduced via conduits 128, 228.

In another aspect of the invention, apparatus 100 shown in FIG. 3 may also be used for biochemical processing, for example, protein processing, for instance, protein separation or protein purification. In this aspect of the invention, a solution containing one or more proteins or molecules of interest, for example, with or without lysed cell or tissue fragments and with or without biological, organic, or inorganic molecular components, may be introduced as fluid 129 into inlet 138. Particulate material 118 may comprise beads or pellets having the ability to absorb or adsorb the protein or molecule of interest from fluid 129 under conditions produced by the contact between fluid 129 and the particle, bead, or pellet 118. Fluid 139 entering inlet 128 entrains at least some of the particulate material 118 upward through conduit 120 and deposits the particulate material 118 either directly or indirectly into vessel 212. The material 118 deposited into vessel 212 is now designated particulate material 218. Particulate material 218 moves downward through vessel 212 as in other aspects of the invention. Fluid 229 entering one or more inlets 238 produces an environment within vessel 212 when it comes in contact with particulate material 218 such that particulate material 218 relinquishes the molecular species into fluid 229 which then exits through outlet 232. The fluid discharged from outlet 232 may or may not proceed to another downstream process, storage, or disposal.

According to this aspect of the invention, fluid 239 entering inlet 228 entrains particulate material 218 through conduit 220 and 160 and deposits the particulate material 218 either directly or indirectly into vessel 112 via inlet 133, where the process in vessel 112 is allowed to continue to proceed. In one aspect, the pH of the fluid 129 in vessel 112 may comprise a fluid that causes some molecular species to adhere to an ion exchange resin, and the pH of fluid 229 in vessel 212 may promote the desorption of the molecular species from the ion exchange resin and so regenerate particulate material 218 for return and continued processing in vessel 112. This biochemical treatment may be practiced at about room temperature, for example, between about 60 and 75 degrees F. and at a pH ranging from 3 to 11.

In another aspect of the invention, apparatus 10 shown in FIG. 1 may also be used for coating particles, for example, coating aerogel particles or coating pharmaceuticals. For example, the particulate material 18 may comprise at least two components: particles to be coated and the coating material, for example, a powder. The particle velocity and solids volume fraction in conduit 20 (that is, the draft tube) can be independently specified and controlled, for example, controlled simultaneously, to provide a more uniform particle coating. As a result, the coating time per pass through the conduit 20 and the environment in which the coating takes place can be selected by the user. In one aspect, apparatus 10 may be used to effectively coat very light aerogel particles (for example, having a density of about 140 kg/m$^3$) with, for example, an alcohol, such as, a polyvinyl alcohol (for instance, a polyvinyl alcohol provided by Colorcon Inc. or its equivalent), a polymethymethacrylate (for instance, a polymethymethacrylate provided by Degussa), or a polyurethane to provide a material having improved thermal insulating properties. These aerogel particles are typically difficult to coat using prior art coating devices because of the low density of aerogel particles.

Figure 4:
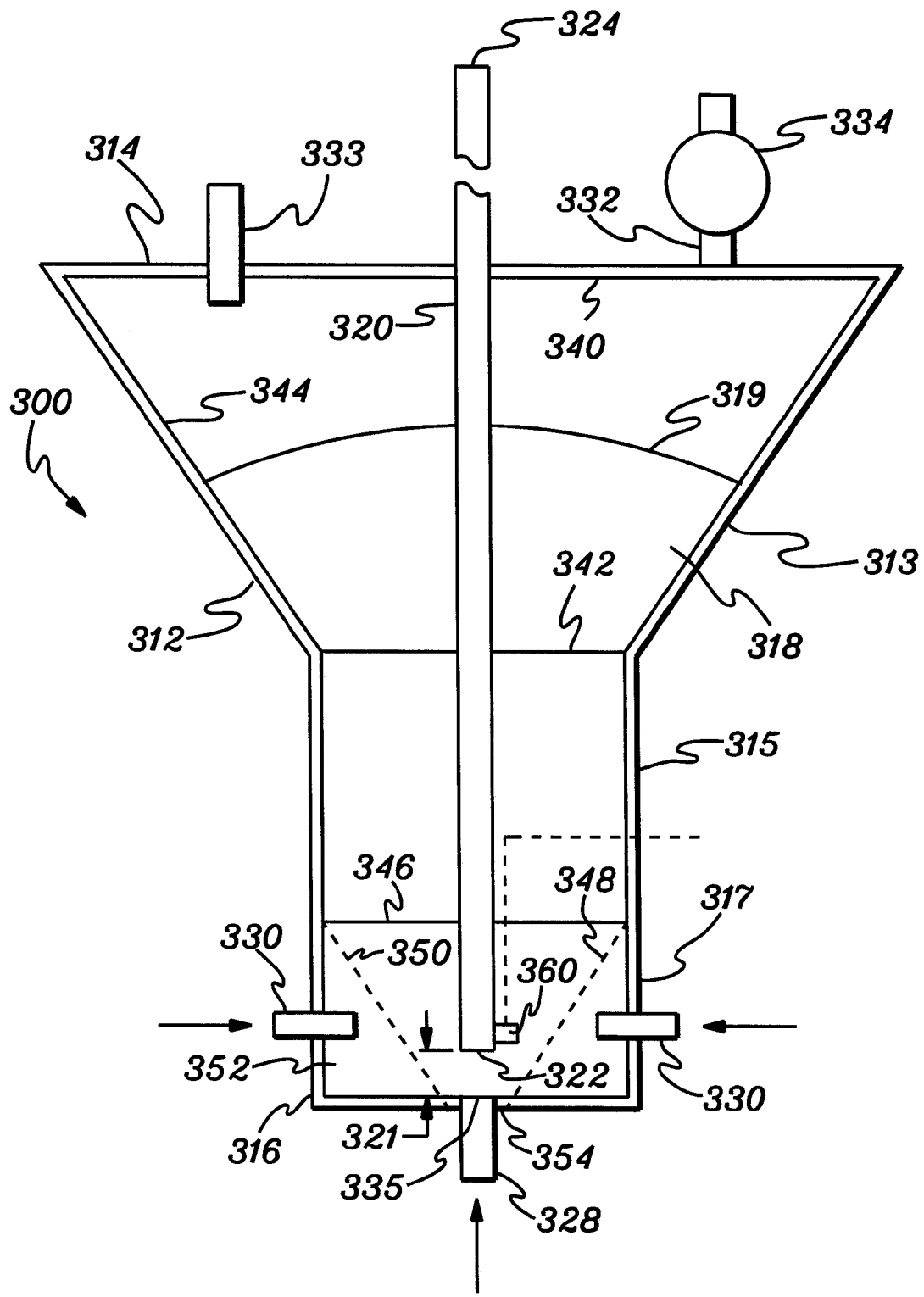
FIG. 4 is a schematic diagram, in cross-section, of another particulate material handling apparatus according to an aspect of the invention.

FIG. 4 is a schematic diagram, partially in cross-section, of a particulate handling apparatus 300 according to one aspect of the invention. Apparatus 300 shown in FIG. 4 is similar to the apparatus described in U.S. Pat. Nos. 5,254,168, and 5,248,222 of Littman, et al.; however, according to aspects of the present invention, apparatus 300 includes improvements over the feeders disclosed in U.S. Pat. Nos. 5,254,168, and 5,248,222.

Similar to apparatus 10, 110, and 210, apparatus 300 includes a vessel 312, having a closed top 314, a closed bottom 316, and contains particulate material 318 having a level 319, for example, one or more of the particulate materials 18 described above. Vessel 312 of apparatus 300 includes at least one conduit 320 having an open first end 322 positioned inside vessel 312 and an open second end 324 positioned outside of vessel 312. Conduit 320 may be similar to and oriented in manner similar to conduit 20 discussed above. The open second end 324 of conduit 320 may be located in a second vessel (not shown in FIG. 4), for example, apparatus 400 shown in FIG. 5. Vessel 312 also includes at least one fluid inlet 328 positioned in the bottom 316 of vessel 132 having an outlet 335, and at least one fluid outlet 332 positioned in the top of vessel 312 having a valve 334. Valve 334 may be adapted to regulate the flow from and/or pressure within vessel 312 or to regulate the flow of particulate material out of conduit 320. As is typical of aspects of the invention, inlet 328 is directed toward inlet 322 of conduit 320 whereby fluid introduced to inlet 328 and directed toward inlet 322 produces a flow of at least some particulate material 318 and fluid through the conduit 320. As shown in FIG. 4, the outlet 335 of inlet 328 may be spaced from inlet 322 a distance $L_t$ represented by arrows 321.

Vessel 312 of apparatus 300, similar to vessels 12, 112, and 212 disclosed above, may typically be sealed vessels. For example, the closed top 314 of vessel 312 may be sealed by conventional means, for example, by means of mechanical fasteners or welding. Closed top 314 may be removably mounted to vessel 312 or include a removal access cover (such as a manhole) to permit access to vessel 312, for example, for introducing or removing particulate material or for servicing.

As shown in FIG. 4, vessel 312 may typically include at least one outlet 332 which includes some means 334, for example, a valve, for regulating or controlling the flow of fluid through outlet 332. Vessel 312 may also include an inlet 333, for example, for introducing particulate material 318 to vessel 312, for instance, prior to initial processing or for repeat processing of the particulate material. Inlet 333 may include an isolation device, for example, a valve, and may be provided with a "quick disconnect" to permit access to the inside of vessel 312, for example, for material removal.

As in the previous aspects of the invention, means 334 is provided to regulate or control the flow of fluid from outlet 332 whereby at least one parameter of the flow of particulate material 318 and fluid though the conduit 320 may be varied.

As shown in FIG. 4, vessel 312 may comprise a vessel of varying geometry. For example, vessel 312 may include an upper or top section 313, a middle section 315, and a lower or bottom section 317. Upper section 313 may comprise a convergent section, for example, a conical convergent section comprising an inverted frusto-conical section having closed top 340, an open bottom 342, and sloping sides 344. Middle section 315 may also be convergent similar to section 313 (for example, having sides with a different angle of convergence than section 313), but may also comprise a circular cylindrical section having an open top mounted to open bottom 342 of section 313, and an open bottom 346. Lower section 317 may also comprise a convergent section, for example, a conical convergent section comprising an inverted frusto-conical section, similar to upper section 313, having an open top mounted to open bottom 346 of section 315, and closed bottom 316, and sloping sides. However, in the aspect shown in FIG. 4, bottom section 317 compresses a circular cylindrical section having an open top mounted to open bottom 346 of middle section 315 and a closed bottom 316. As shown, bottom section 317 may comprise a conical head 348 or may include an insert 348 having an open top mounted to the open bottom 346 of middle section 315, a closed bottom 354, and convergent or conical sides 350 forming an annular cavity 352 between the circular cylindrical section of 317 and the conical sides 350. Side walls 350 may include one or more perforations, orifices, or inlets that provide fluid communication between annular cavity 352 and the inside of lower section 317. In one aspect of the invention, vessel 312 may include at least one pressure detector 360 to provide a pressure indication in vessel 312, and more specifically, a pressure indicative of the pressure at the inlet 322 of conduit 320 to be used in providing an indication of the pressure drop across conduit 320. The detected pressure signal may be forwarded to control system, for example, control system 580 shown in FIG. 7. Pressure indicator 360 may be located anywhere in vessel 312, but preferably is located as close to inlet 322 as possible.

As shown in FIG. 4, fluid inlet 328 may penetrate the closed bottom 354 of convergent head or insert 348, for example, at or near the apex of the convergent head or insert 348, and direct fluid toward open inlet 322 of conduit 320. In addition, apparatus 300 may include one or more inlets 330 directed through the side wall of lower section 317 to augment or replace the fluid provided by inlet 328. The fluid flow introduced through the one or more inlets 330 may primarily aerate the particulate material in the annulus outside of conduit 320 and inside of vessel 312. The fluid provided by the one or more inlets 330 may be the same fluid or a different fluid from that introduced to inlet 328. In one aspect, inlets 330 comprise conduits that penetrate the conical sides 350 of head or insert 348 (for example, when sides 350 are not perforated) or conduits 330 may terminate within annular cavity 352 and supply fluid to the one or more perforations in conical sides 350 of convergent insert 348.

Figure 5:
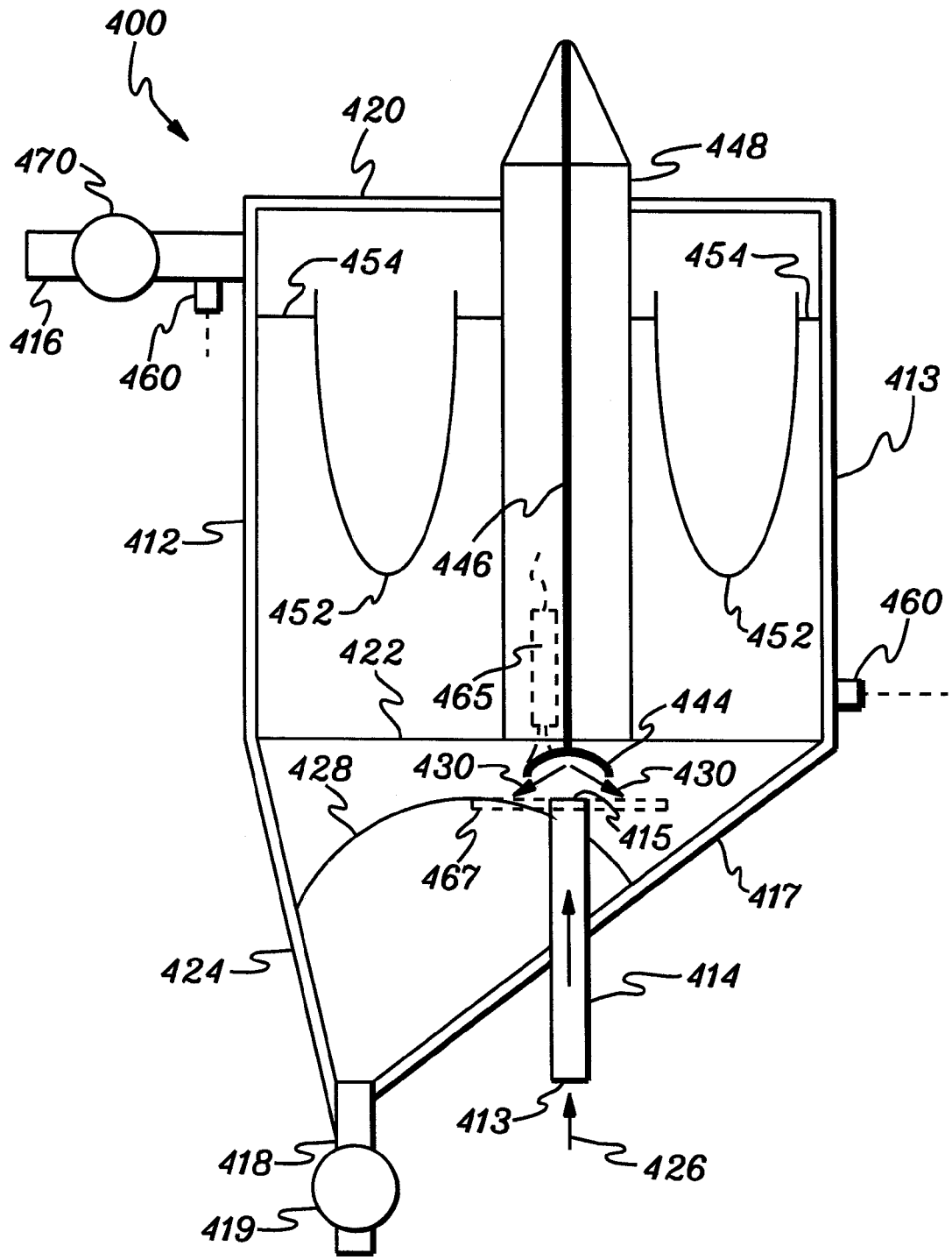
FIG. 5 is a schematic diagram, in cross-section, of vessel to which the apparatuses illustrated in FIGS. 1 and 4 may discharge particulate material.

FIG. 5 is a schematic diagram, in cross-section, of an apparatus 400 into which the apparatus 10, 100, and 300 illustrated in FIGS. 1 and 4 may discharge particulate material. Apparatus 400 includes a vessel 412 having an inlet conduit 414 for particulate material and fluid, an outlet conduit 416 for primarily fluid, for example, a gas, such as air, and a particulate material outlet conduit 418, which may discharge a fluid, such as water. Inlet conduit 414 includes an open first end 413 and an open second end 415. Outlet conduit 418 may typically include a valve 419, for example, an isolation knife gate valve. As shown in FIG. 5, vessel 412 may be multiple sections, for example, an upper or top section 413 comprising a cylindrical vessel, for example, a circular cylindrical vessel, having closed top 420 and an open bottom 422. Vessel 412 may also include a lower or bottom section 417 having an open top mounted or connected to open bottom 422 of section 413 and a substantially closed bottom 424. As shown, bottom section 417 may comprises a downwardly converging bottom section, for example, having an inverted frusto-conical shape. The frusto-conical shape of section 417 may have an axis concentric with the axis of upper section 413, or, as shown, may have an axis that is off set from the axis of upper section 413, for example, whereby section 417 converges to outlet 418 to one side of apparatus 400.

According to aspects of the invention, apparatus 400 receives a stream of particulate material and fluid, for example, air or water, via inlet 414, as indicated by arrow 426 (for example, from one of conduits 20, 120, 220, or 320 described above). In one aspect, inlet conduit 414 comprises the upper end of one of conduits 20, 120, 220, or 320 described above. In one aspect, inlet conduit 414 may be a separate conduit from the above-referenced conduits, for example, apparatus 400 may be distal from the apparatus 10, 100, and 200 described above and communicate with those apparatus by means of one or more conduits.

In one aspect of the invention, vessel 412 may include at least one pressure detector 460 to provide a pressure indication in vessel 412, and more specifically, a pressure indicative of the pressure at the outlet 415 of conduit 414 to be used in providing an indication of the pressure drop across conduit 414. The detected pressure signal may be forwarded to control system, for example, control system 580 shown in FIG. 7. Pressure indicator 460 may be located anywhere in vessel 412, but preferably is located as close to outlet 415 as possible. As shown in FIG. 5, in one aspect, outlet conduit 416 includes a pressure-regulating device 470, for example, a control valve. Pressure regulating device 470 provides a means for regulating and controlling the pressure in vessel 412. As shown, a pressure indicator 460 may be located upstream of device 470 as shown. According to aspects of the invention, by regulating and controlling the pressure in vessel 412, and thus the pressure at the outlet 415 of conduit 414, with knowledge of the pressure at the inlet of conduit 414, the pressure drop across conduit 414 may be regulated and controlled. The regulating and control of this pressure drop allows the operator to regulate and control the flow regime (for example, dense or dilute phase flow) through conduit 414, as well as, the solids flow rate and the solids fraction flowing through conduit 414.

In one aspect, apparatus 400 functions as a separation device for the particulate material and fluid introduced to inlet conduit 414. For example, in one aspect, the particulate material, for example, particulate material 18 described above, introduced to inlet conduit 414 is discharged from second end 415 whereby at least some, typically, most, of the particulate material settles in the closed bottom 424 of lower section 417 of vessel 412, as indicated by material level 428, and the fluid, typically, air, is discharged from outlet conduit 416. In one aspect of the invention, apparatus 400 includes means to enhance this particle-fluid separation.

As shown in FIG. 5, inlet conduit 414 typically penetrates bottom section 417 and terminates in vessel 412 at second end 415. According to aspects of the invention, conduit 414 may terminate at a location adjacent to a plate 444 mounted in vessel 412 whereby the discharged particulate material and fluid from conduit 414 impacts plate 444. The impact of material on plate 444 may typically be a turbulent impact whereby clumps of particulate material, if present, are disrupted (that is, according to aspects of the invention, plate 444 may be referred to as an "impaction plate") and the particulate material may be deflected toward the closed bottom 424 as indicated by arrows 430. At the same time, the impact of the stream of particulate material and fluid against plate 444 further promotes intermingling or mixing of the particulate material, that is, above the mixing that occurs in conduits 20, 120, 220, 320, and/or 414. After impact, the particulate material typically collects under the force of gravity in the bottom chamber section 417 as indicated by material level (or pile)

428. The particulate material may be recycled to vessel 412 or to another vessel, such as, vessel 312 in FIG. 4, through conduit 418 and valve 419.

As shown in FIG. 5, impaction plate 444 may be a hemispherically-shaped surface that directs the particulate material toward the closed bottom 424 of vessel 412. However, in one aspect, impaction plate 444 may be any surface in vessel 412 upon which the stream of particulate material and fluid may be directed whereby at least some of the clumps of particulate material, if present, are disrupted and commingling or mixing of the individual particulate materials is promoted or enhanced. In one aspect, the impact of particulate material on impaction plate 444 may also disrupt particulate clusters or clumps whereby the presence of particle clusters or clumps in the particulate material is reduced or eliminated. Further details of impaction plate 444 are illustrated and described with respect to FIG. 6 below.

In contrast to the prior art system disclosed by Plawsky, et al. (2003), where the draft tube directs the particulate material to a cyclone-type separator to remove gas and fine particulate from the particulate stream and little or no mixing or cluster disruption is provided, in aspects of the present invention, the impaction plate 444 may typically turbulently or violently disrupt the flow of particulate material discharged from inlet conduit 414 or conduits 20, 120, 220, and 320 to promote further mixing of the particulate material and the elimination of particle clusters and clumps.

Impaction plate 444 may be suspended or mounted anywhere within vessel 412 by conventional means. As shown in FIG. 5, impaction plate 444 may be mounted by a mounting rod 446 suspended from the closed top 420 of vessel 412. As also shown in FIG. 5, impaction plate 444 and mounting rod 446 may be mounted within conduit 448, which may also be suspended from closed top 420, though in one aspect, conduit 448 may be omitted. According to other aspects of the invention, impaction plate 444 may by mounted by means of one or more support arms (not shown) projecting from the internal walls of vessel 412, mounted directly to the internal walls of vessel 412, or comprise a surface of the internal walls of vessel 412, among other mounting arrangements.

Depending upon the material being treated, for example, coated, impaction plate 444 may be omitted. For instance, impaction against plate 444 may be undesirable for delicate particulate materials, such as, pharmaceutical pills, candy, or a coated particle, which could be damaged upon impaction. In one aspect, impaction plate 444 may be replaced with a downward moving fluid stream that may provide a more gentle means of commingling the particulate material or prevent damage.

In one aspect of the invention, where apparatus 400 shown in FIG. 5 may also be used to coat particles, for example, aerogel particles, the coating fluid may be introduced, for example, in heated air, at the outlet 415 of conduit 414. For example, the coating fluid may be introduced by means of a nozzle in a fine spray, for example, a fine spray of one of the coating fluids mentioned herein, such as provided by Colorcon. A typical nozzle location is shown schematically as nozzle 465 in FIG. 5. Coating nozzle 465, shown in phantom, may be used with or without impaction plate 444. In one aspect, impaction plate 444 is omitted and coating nozzle 465 may be centrally located above outlet 415. In addition or in lieu of providing heated air, to aid in the drying of the coating on the particles, a heating device may also be provided in the path of the particles after they are coated, for example, a heating ring as shown by ring 467 shown in phantom in FIG. 5.

Figure 6:
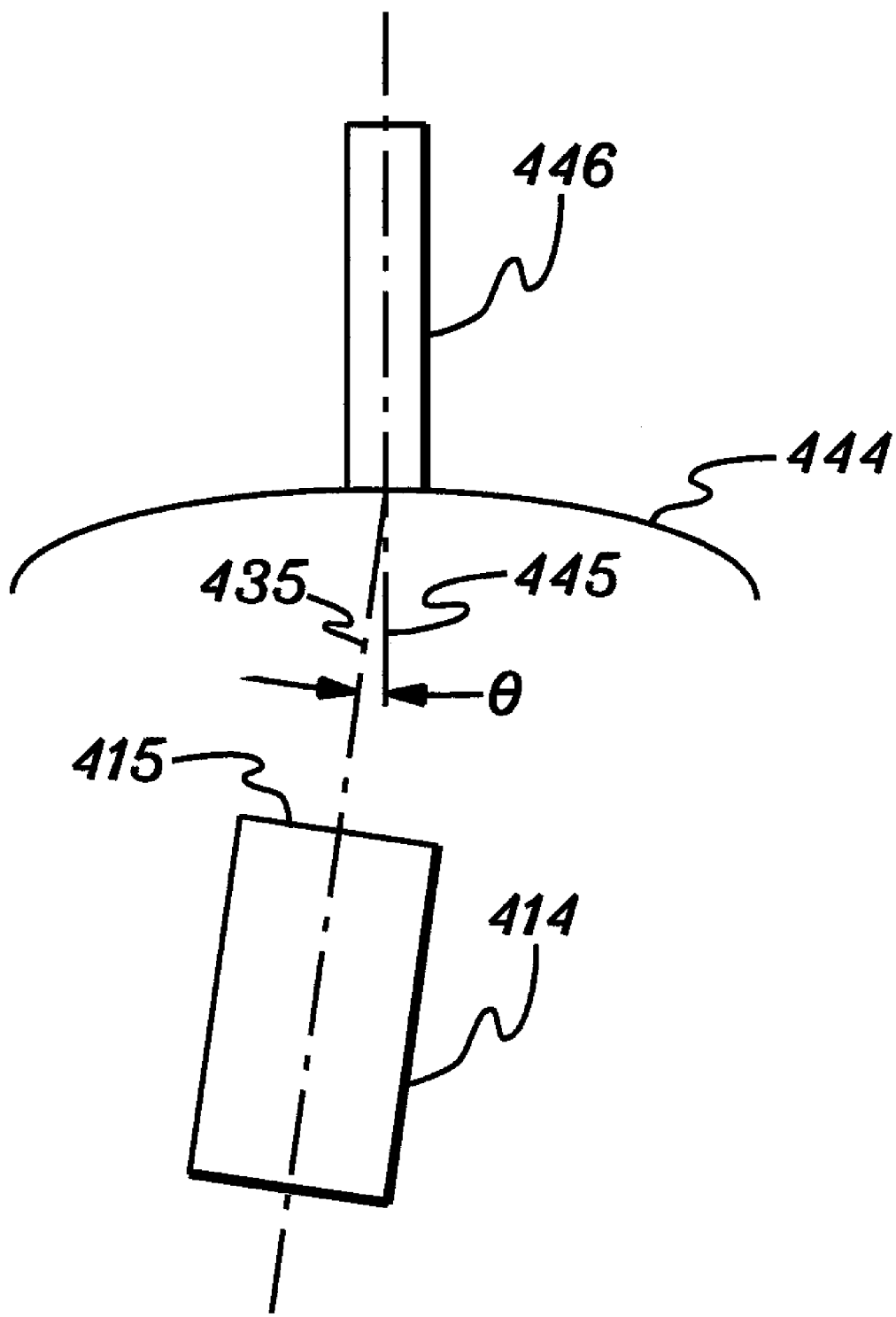
FIG. 6 is a detailed schematic view of the outlet of the tube and impact plate shown in FIG. 5 according to one aspect of the invention.

FIG. 6 is a detailed schematic view of the second open end 415 of inlet conduit 414 and impact plate 444 shown in FIG. 5 according to one aspect of the invention. As shown in FIG. 6, impaction plate 444 may comprise any substantially flat or curved plate positioned to receive a flow of particulate material and fluid discharged from conduit 414. Impaction plate 444 may have a normal 445 at the point or vicinity of impact of the particulate material that makes an angle $\Theta$, with the axis 435 of conduit 414. In one aspect, the angle $\Theta$ may range from about 0 degrees (that is, the point of impact on plate 444 may be substantially perpendicular to the axis of conduit 414) to an angle of about 60 degrees, but $\Theta$ typically may range from about 0 degrees to about 30 degrees. The normal 445 of impaction plate 444 may be coaxial with the centerline 435 of conduit 414; however, these centerlines may also be offset from each other, as shown in FIG. 6, for example, due to fabrication tolerances or as desired.

While the particulate material typically settles in the bottom of vessel 412, as indicated by level or pile 428, the fluid (typically, gas, though the fluid may be a liquid) introduced by means of conduit 414 and used to entrain and transport the particulate material through conduit 414 is typically removed from vessel 412 via the one or more outlet conduits 416. Conduits 416 may be positioned anywhere in vessel 412 above the expected level 428 of particulate material collected. As shown in FIG. 5, outlet 416 may typically be positioned toward the closed top 420 of vessel 412.

Due to the nature of the transport and the impact of particulate material in aspects of the invention, it is possible that at least some fine particulate material will be generated in vessel 412. For example, in the processing of mortar from sand and cement, fine cement particles are typically generated in vessel 412, for example, due to impact of the material against impaction plate 444. In order to minimize the escape of fine entrained particles with the fluid stream discharged from outlet 416, according to one aspect of the invention, at least some form of particulate filtering medium or collection system may typically be provided. As shown in FIG. 5, according to one aspect of the invention, apparatus 400 may include at least one filter bag 452 adapted to collect fine particulate material generated while allowing the passage of fluid (again, typically air) to prevent the particulate material from discharging with the fluid discharged from outlet 416. According to one aspect, a plurality of filter bags 452 may be suspended in vessel 412. The filter bags 452 may be mounted in vessel 412 by conventional means, for example, bags 452 may be mounted on support cables 454 suspended in vessel 412. The filter bags 452 may be conventional filter bags, for example, filter bags provided by STACLEAN Diffuser Company of Salisbury, N.C., or Gore-tex bags provided by W. L. Gore Corporation, or their equivalent. In one aspect of the invention, the collection of filter bags mounted in apparatus 400 may be referred to as a "bag house" filtration system. In one aspect of the invention, the typically fine particulate material accumulated on filter bags 452 may be returned to the particulate mixture collected in bottom section 417, for example, by agitation or back flushing of filter bags 452. In another aspect, the typically fine particulate material accumulated on filter bags 452 may be isolated from the particulate mixture collected in bottom section 417 and forwarded to further processing or disposal.

The handling and separation operation described with respect to FIGS. 1-6 may be operated in "batch" or in "continuous" mode. In batch mode, after completion of a treatment or mixing "run" where the particulate materials in apparatus 10, 110, 210, or 300 are depleted, the particulate mixture in vessel 412 may be forwarded to further processing, for example, packaging or storage, or returned to apparatus 10, 110, 210, or 300 for further processing. For example, the particulate material in pile 428 in vessel 412 shown in FIG. 5 may be transferred to apparatus 10, 110, 210, or 300 via outlet conduit 418 and inlet conduits 33, 233, or 333 (see FIGS. 1-4) by opening isolation valve 419, for example, a knife gate valve. In continuous mode, the particulate material to be treated or mixed may be substantially continuously introduced to apparatus 10, 110, 210, or 300, for example, by means of conduit 33, 233, or 333, respectively, and substantially continuously removed from vessel 412 and forwarded to further processing, for example, via a conduit that communicates with outlet conduit 418 in vessel 412.

Figure 7:
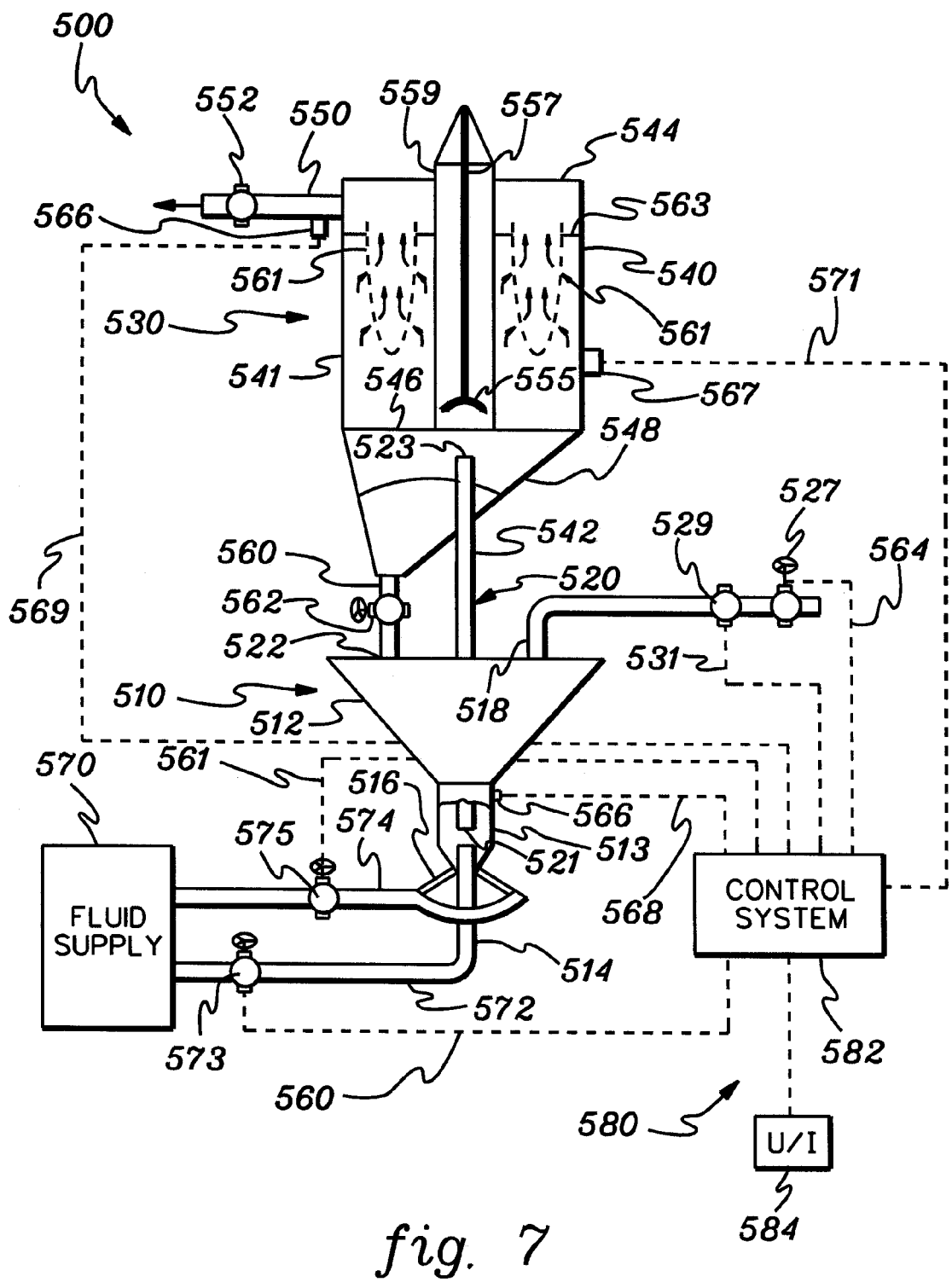
FIG. 7 is a schematic diagram of a system employing aspects of the present invention.

FIG. 7 is a schematic diagram of a system 500 incorporating the apparatus 300 according to aspects of the present invention. System 500 includes a feeding or treatment apparatus 510 comprising a vessel 512, an inlet chamber 513, a main fluid inlet 514, one or more supplemental fluid inlets 516, a fluid outlet 518, a draft tube 520, and a particulate material inlet 522. As described above with respect to earlier aspects, apparatus 500 may comprise a handling, mixing, conveying, treatment and/or reaction system. For example, apparatus 500 may be used to mix particulate material; to treat fluids introduced through inlets 514 and 516; to treat a first fluid, for example, a fluid introduced to inlet 514, with a second fluid, for example, a fluid introduced to inlets 516; to treat particulate material in vessel 512 with one or more fluids via inlets 514 and 516; to react one or more fluids introduced via inlets 514 and 516; to react particulate material in vessel 512 with one or more fluids introduced via inlets 514 and 516; to coat particulate material with one or more fluids introduced via inlets 514 and 516, among other functions.

Apparatus 510 may comprise one or more of the apparatus 10, 110, 210, or 300 disclosed above. System 500 also includes a separation apparatus 530 comprising a vessel 540 including particulate and fluid inlet 542 in fluid communication with draft tube 520, a fluid outlet 550, and a particulate material outlet 560. As shown, tube 520 includes an inlet 521 positioned in inlet chamber 513 and an outlet 523 positioned in apparatus 530. Apparatus 530 may comprise apparatus 400 shown in FIG. 5.

Though apparatus 530 is shown positioned vertically above and close to apparatus 510 in FIG. 7, apparatus 530 may be distal apparatus 530 and draft tube 520 and fluid inlet 542 may comprise one or more transport conduits that effectively place apparatus 510 and apparatus 530 in fluid communication with each other. For example, apparatus 510 and apparatus 530 may be connected by means of a rigid or a flexible transport line having bends or elbows and appropriate support hangers, as is conventional.

As shown in FIG. 7, system 500 includes at least one fluid supply 570 operatively connected to inlets 514 and 516; numerous control and monitoring devices (as will be discussed below); a control system 580 adapted to control system 500 based, for example, upon user input, for instance, via user interface (U/I) 584, and/or the parameters monitored by the control and monitoring devices. Though aspects of the present invention are adapted to mixing mortars, for example, mortars comprising sand and cement, system 500 in FIG. 7 may be used to mix or treat any particulate material, for example, any particulate material that can be pneumatically transferred. For example, the system shown in FIG. 7 may be adapted to mix pharmaceuticals for blending active ingredients, blending active ingredients with excipients (that is, inert or substantially inert substances), blending excipients, food production, nutraceutical production (such as, for the production of dietary supplements), ceramics processing, paint and pigment processing, the treatment of fluids or particulate material as described above, or as need in any field requiring the handling, conveying, treatment, reacting, or mixing of powders or particulates.

As shown in FIG. 7, main fluid inlet 514 and supplemental fluid inlets 516 receive a flow of pressurized fluid, typically, air, from fluid supply 570 through conduits 572 and 574, respectively. Fluid supply 570 may comprise two or more fluid supplies providing two or more fluids to conduits 572 and 574, respectively, for example, two or more reactants to be reacted in vessel 512. Fluid supply 570 typically includes some form of fluid pressurizing device, such as, a pump or blower (not shown) and conduits 572 and 574 typically include some form of fluid flow control devices, such as, automated control valves 573 and 575, respectively. The one or more inlets 516 may comprise 3, 4, or more inlets evenly spaced about the inlet chamber 513 of vessel 512. In one aspect, inlets 516 may also vary in elevation about inlet chamber 513, for example, in a regular pattern.

As shown, inlet conduit 542 includes an open end 523 positioned within vessel 540. Inlet conduit 542 may comprise an extension of tube 520. Outlet conduit 560 may typically include a valve 562, for example, an isolation knife gate valve, though a standpipe which allows solids to pass downward and fluids to pass upward may also be used. Vessel 540 may comprise multiple sections, for example, an upper or top section 541 comprising a cylindrical vessel, for example, a circular cylindrical vessel, having closed top 544 and an open bottom 546. Vessel 540 may also include a lower or bottom section 548 having an open top mounted or connected to open bottom 546 of section 541. Bottom section 548 may comprise a downwardly converging bottom section, for example, having an inverted frusto-conical shape. The frusto-conical shape of section 548 may have an axis concentric with the axis of upper section 541, or, as shown in FIG. 7, may have an axis that is offset from the axis of upper section 541, for example, whereby section 548 converges to outlet 560 to one side of apparatus 530. Vessel 540 may also have other appropriate shapes.

As shown in FIG. 7, apparatus 530 may include an impaction plate 555 positioned above open end 523 of conduit 542, for example, an impaction plate similar to plate 444 shown in FIGS. 5 and 6. As described previously, impaction plate 555 provides a surface upon which the particulate material discharged from conduit 542 impacts whereby clumps of particulate material, if present, are disrupted and the particulate material may be deflected toward the closed bottom section 548 of vessel 540. Impaction plate 555 may be mounted within apparatus 530 by conventional means. As shown in FIG. 7, impaction plate 555 may be centrally mounted by a mounting rod 557 suspended from the closed top 544 of vessel 540. As also shown in FIG. 7, impaction plate 555 and mounting rod 557 may be mounted within conduit 559, which may also be suspended from closed top 544.

According to one aspect of the invention, the fluid flow $F_3$ from outlet 518 may provide a means of regulating the pressure in feeder 510. For example, in one aspect, the pressure drop, $\Delta P_{DT}$, measured from the inlet 521 to the outlet 523 of tube 520, may provide a measure of the force available to support the fluid-solid suspension flowing in tube 520. The pressure drop that the fluid, typically, air, experiences flowing across filter bags 561 may typically be small, whereby the pressure, $P_i$, at the inlet 521 of tube 530 may define the pressure gradient, $\Delta P_{DT}$ that is available to accelerate and support the solids and overcome both fluid-wall and solids-wall friction. The solid fraction flowing in tube 520 is typically the major contributor to the pressure gradient in both dilute and dense phase flows. Therefore, the solids concentration in tube 520 typically requires establishing a pressure gradient, $\Delta P_{DT}$, across tube 520 by manipulating, controlling, or otherwise regulating the pressures at the inlet 521 and/or outlet 523 of tube 520, for example, by restricting the flow through tube 520, for instance, by restriction 21 (see FIG. 1), or the flow of fluid downstream of tube 520, for instance, by manipulating valve 552.

Control system 580 is adapted to control the operation of system 500 based on user input and/or detected operating parameters. The operation of system 500 may be monitored and controlled automatically by control system 580. Control system 580 may include main controlling device 582 and user interface (U/I) 584, for example, a keyboard, mouse, or touch screen, as is conventional. Controlling device 582 may a dedicated personal computer or a dedicated control system, for example, having PLC controllers having PID control algorithms adapted to monitor and control the operation of system 500 based upon the particulate material being handled and the desired handling, mixing, or treatment.

In one aspect of the invention, at least two parameters (typically, at least three parameters) may be regulated and controlled by control system 580. For example, control system 580 may control the flow of fluid through conduits 572 and 574 to inlets 514 and 516, respectively. As shown in FIG. 7, the flow of fluid through conduit 572 may be regulated and controlled by flow control valve 573 and the flow of fluid through conduit 574 may be regulated and controlled by flow control valve 575. Conduits 572 and 574 may include flow-measuring devices, such as flow meters or DP cells (not shown). The measured parameters and control signals to and from valves 573 and 575 and the flow measurement devices may communicate with control system 580 via electrical connections 560 and 561, for example, a 4-20 mA signal or a 0-1 VDC, 0-5 VDC, or 0-10 VDC signal. The flow of fluid from outlet 518 may also be regulated and controlled by control system 580 by means of control valve 527 and/or flow measuring device 529 via electrical connections 564 and 531, respectively.

As shown in FIG. 7, vessel 512 may include at least one pressure detector or sensor 566, the signal for which may be transmitted to control system 580 via electrical connection 568. According to aspects of the invention, pressure sensors 566 provide a pressure indication in vessel 512, and a pressure indicative of the pressure at the inlet 521 of conduit 520 to be used in providing an indication of the pressure drop across conduit 520. Pressure sensor 566 may be located anywhere in vessel 512, but preferably is located as close to inlet 521 as possible. As shown in FIG. 7, in one aspect, outlet conduit 550 of vessel 540 may include a pressure-regulating device 552, for example, a control valve. Pressure regulating device 552 may provide a means for regulating and controlling the pressure in vessel 540. As shown, a pressure indicator 566 may be located upstream of device 552 and communicate with control system 580 via electrical connection 569. According to aspects of the invention, by regulating and controlling the pressure in vessel 540, and thus the pressure at the outlet 523 of conduit 520, with knowledge of the pressure at the inlet of conduit 520 (for example, as indicated by pressure sensor 566), the pressure drop across conduit 520 may be regulated and controlled. Again, according to aspects of the invention, the regulating and control of this pressure drop across conduit 520, allows the operator to regulate and control the flow regime through conduit 520, for example, dense or dilute phase flow, as well as, solids mass flow rate and solids fraction. A pressure sensor 567 may also be positioned anywhere on vessel 540 to indicate the pressure in the vessel, and communicate with control system 580 via electrical connection 571.

System 500 shown in FIG. 7 may also be adapted to function as a reactor for reacting the particulate material with a fluid, for example, with the constituents of a fluid. Though system 500 may be adapted to many types of reagents and fluids, the following description of the treatment of waste water with a photocatalyst is presented as one exemplary reaction that may provided in system 500. According to one aspect of the invention, vessel 512 may contain photocatalyst particles, that is, a catalyst that is activated by ultraviolet (UV) light, for example, a titanium dioxide ($TiO_2$) photocatalyst particles or pellets. As is typical of such catalysts, when activated (understood to mean when an electron "hole" is generated), the $TiO_2$ pellet is imbued with an affinity for negative ions (to fill that "hole"). In one aspect, waste water, for example, filtered waste water, may be introduced to inlets 516 in vessel 512 and allowed to flow upward through the activated photocatalyst pellets. In this application of system 500, inlets 516 are preferably positioned distal inlet 514 (for example, as shown in FIG. 3) to minimize or prevent mixing of the waste water with the clean water introduced to inlet 514. In this case, due to its affinity for negative ions, the activated $TiO_2$ photocatalyst attracts a hydroxyl ion ($OH^-$) producing a hydroxyl radical (OH.). The hydroxyl radical is then available to oxidize constituents of the waste water, for example, organic material, such as pathogens, though inorganic material may also be beneficially oxidized. According to this aspect of the invention, as the waste water passes upward through the catalyst bed, typically without mixing of the bed, the catalyst pellets pass downward in a counter-current fashion toward the inlet 521 of conduit 520. As the wastewater rises through the catalyst pellets, the waste water is exposed to hydroxyl radicals, the wastewater constituents are oxidized and the activity of the catalyst is reduced. By the time the waste water reaches the top of the catalyst bed, the waste water may be substantially completely oxidized where the oxidized waste water can be discharged from outlet 518 and forwarded to storage; reuse, for example, as a source of water to inlet 514; or further treatment, for example, in another oxidation system 500.

At the same time, as the down flowing catalyst reaches the inlet 521 of conduit 520, the catalyst's activity may typically be reduced or depleted entirely. The "spent" catalyst may then be transferred through conduit 520, in a fashion typical of aspect of this invention, by the introduction of, for example, relatively clean water into inlet 514. The spent catalyst may, for example, be conveyed to a UV source to regenerate the catalyst. The UV source may be located in conduit 520, in vessel 540, in a conduit between vessels 540 and 512, or at a remote location. In one aspect, vessel 540, with or without impaction plate 555, may assist in separating the catalyst from the fluid, for example, by acting as a settling tank. After, UV regeneration, the activated catalyst may be reintroduced to inlet 522 and returned to vessel 512 to treat further waste water. Again, though waste water oxidation is described as one reaction that may be performed in system 500, it will be apparent to those of skill in the art that other similar or related reactions, for example, those that may benefit from the counter-current treatment and/or isolation of fluids that characterize aspects of the invention, may also be implemented in system 500.

According to one aspect of the invention, the appropriate control of the operation of system 500 permits a wide range of particle velocities and concentrations (that is, solids fractions) in tube 520. For example, appropriate control of the operation of system 500 allows for different regimes of flow to exist in tube 520 that can be exploited depending on the materials being handled, mixed, and/or treated. The following description explains how the operating variables may determine the solids and gas flow rates, solids loading, and particle concentration in tube 520 according to aspects of the invention.

According to one aspect of the invention, at least four variables may be manipulated and controlled to establish a desired flow regime in tube 520. These include the following fluid flows: the fluid jet flow, $F_1$, to the bottom of the feeder 510 into inlet 514; the auxiliary fluid flow, $F_2$, to the inlet chamber 513 via inlets 516; the fluid flow, $F_3$ that passes from the inlet chamber 513, through the particulate material, and out of outlet 518; and the pressure drop, $\Delta P_D$, across the draft tube 520. The fluid flow in tube 520, $F_t$, may be determined by a mass balance of the fluid flows into and out of feeder 510, for example, by Equation 1.

$$F_t = F_1 + F_2 - F_3 \quad \text{Equation 1}$$

According to one aspect of the invention, the fluid flow $F_3$ from outlet 518 may provide a means of regulating the pressure in feeder 510. For example, in one aspect, the pressure drop, $\Delta P_D$, measured from the inlet 521 to the outlet 523 of tube 520, may provide a measure of the force available to support the fluid-solid suspension flowing in tube 520. The pressure drop that the fluid, typically, air, experiences flowing across filter bags 561 may typically be small, whereby the pressure, $P_i$, at the inlet 521 of tube 530 may define the pressure drop, $\Delta P_D$, that is available to accelerate and support the solids and overcome both fluid-wall and solids-wall friction. The solid fraction flowing in tube 520 is typically the major contributor to the pressure drop in both dilute and dense phase flows. Therefore, the solids concentration in tube 520 typically requires establishing a pressure drop, $\Delta P_D$, across tube 520 by manipulating, controlling, or otherwise regulating the pressures at the inlet 521 and/or outlet 523 of tube 520. For example, the pressure drop across tube 520 may be regulated or controlled by restricting the flow through tube 520; by restricting the flow of fluid downstream of tube 520, for instance, by manipulating valve 552; by introducing an under pressure, for example, a sub-atmospheric pressure or vacuum in vessel 540; by introducing an overpressure to vessel 540, for example, by introducing a fluid to vessel 540; or by a combination thereof.

The solid concentration flowing in tube 520 may also be affected by the distance, $L_t$, between inlet 521 of tube 520 and the outlet of inlet conduit 514 of apparatus 510, that is, the distance 321 shown in FIG. 4. In one aspect, the solids concentration in tube 520 may be a strong function of $L_t$. However, even when the distance $L_t$ is large, the pressure at the inlet 521 of tube 520 may determine whether the flow in conduit 520 can be supported.

Another flow variable that may be controlled in one aspect of the invention is the particle velocity, $V_p$, of particles through tube 520. In one aspect, the means for controlling the particle velocity, $V_p$, is by controlling the fluid flow $F_1$, for example, when most of the fluid introduced to inlet 514 passes into and through tube 520. However, according to one aspect of the invention, there are a variety of flow conditions that can be achieved using the system 500 shown in FIG. 7, for example, by setting the fluid flow through tube 520. Ultimately, the solid concentration in the conduit 520 is determined by the pressure drop imposed across conduit 520. Some of these flow conditions are summarized in Table 1 below.

TABLE 1

Examples of Flow Regimes of the Invention

| Flow Property | Value of system variables | | | | |
|---|---|---|---|---|---|
| | $L_t$ | $F_1$ | $F_2$ | $F_3$ | $\Delta P$ (feeder) |
| Low solids fraction, High particle velocity | Low | High | Low | Low (to insure the jet air primarily moves up the draft tube) | Low |
| Low solids fraction, low particle velocity | Low | Low | Low | Higher than above to insure any flow through $F_2$ is not diverted into the draft tube. | Low |
| High solids fraction, high particle velocity | High* | High | High | Low | High |
| High solids fraction, low particle velocity | High* | Low | High | Higher than above to insure any flow though $F_2$ is not diverted into the draft tube. | High |

*but less than the maximum spoutable height.

According to one aspect of the invention, the flow $F_3$ may be such that the fluid velocity produced is less than the minimum fluidization velocity in the annulus about conduit 520 in inlet chamber 513, for example, to minimize or prevent undesired disruption of the particulate material in this annulus. It will be understood by those in the art that the flow through tube 520, that is, $F_t$, must typically be such that the fluid velocity produced in tube 520 is greater than the minimum fluid velocity required to transport the particulate material through tube 520.

In one aspect of the invention, a typical control scheme for operating system 500 may comprise the flow of fluid through inlet flow control valves 573 (also known as $CV_1$) and 575 ($CV_2$), through outlet flow control valve 527 ($CV_3$), and the pressure drop $\Delta P_D$ across conduit 520 in FIG. 7. As is typically in the art, each of control valves 573, 575, and 527 may be actuated independently. For given flows through valves 573 and 575, the system may produce a solid and fluid flow rate through tube 520, that is, $F_t$, that is determined in part by the resistance of flow through annular inlet chamber 513. For example, the more material there is in inlet chamber 513, the greater will be the pressure drop $\Delta P_D$ across the tube 520. To increase the solid flow through tube 520, increasing the flow $F_2$ and maintaining the flow $F_3$ will produce higher pressure inside of apparatus 510 whereby a higher flow through tube 520 will be provided. Likewise, for given flows $F_1$ and $F_3$, decreasing $F_2$ will also decrease the amount of solid being transported through tube 520. The pressure drop $\Delta P_D$ may be regulated and controlled by varying the pressure at the inlet 521 or the outlet 523. The pressure the inlet 521 is typically dictated by the flows $F_1$, $F_2$, and $F_3$ while the pressure at the outlet is typically dictated by pressure control device 552. In one aspect, by manipulating one or more of these flow rates and/or the pressure control device 552 the flow regime through conduit 520, as well as, the solids mass flow rate and the solids fraction, can be regulated and controlled as desired.

In one aspect of the invention, one or more of the following values may be monitored and controlled: the mass flow through valve 573 ($CV_1$), that is, $F_1$; the mass flow through valve 575 ($CV_2$), that is, $F_2$; the mass flow through valve 527

($CV_3$), that is, $F_3$; the pressure drop across draft tube 520, $\Delta P_D$; the distance (or clearance) between the end of inlet conduit 514 and the end 521 of tube 520 ($L_t$); or combinations thereof. For example, the operation of system 500 may be regulated by controlling the flow through tube 520, that is, $F_t$, by controlling the flow of fluid through each of valves 573, 575, and 527, for example, to adhere to the mass flow relationship defined in Equation 1. In another aspect of the invention, flow through valves 573 and 575, that is, $F_1$ and $F_2$, may be held substantially constant, and $\Delta P_D$ may be controlled by regulating the flow $F_3$ from conduit 518 and/or by pressure control device 552. In another aspect, the pressure detected by sensor 566 in outlet 550 may be regulated by control device 552. Those of skill in the art will recognize that these are simply two of the many control regimes that may be used for aspects of the invention.

According to one aspect of the invention, operation of the system 500 may comprise first setting the draft tube spacing, $L_t$, and then regulating the flow of fluid mass though valves 573 ($F_1$) and valve 575 ($F_2$) and setting pressure control device 552 to provide the transport of particles through tube 520 in a desired regime, for example, a dense phase turbulent flow. The annulus air flow though valve 575 ($F_2$) may be adjusted to set the desired solids fraction in the tube 520 and the flow through valve 573, that is, the "jet flow," ($F_1$) may be used to determine the particle velocity in tube 520. In one aspect, a solids mass flow rates up to 0.76 kg/s flowed through a 28.45 mm tube 520 (299 kg/m² s) was achieved. The solids mass flow rate in tube 520 can be varied by changing the draft tube spacing, $L_t$, the flow to through inlets 516 (that is, the aeration of the annulus"), the flow through inlet 514 (that is, the "jet flow rate"), flow through outlet 518, or the pressure via pressure control device 552. Table 2 presents typical operating parameters for the apparatus 500 according to aspect of the invention, specifically, when the invention was used to coat 1 mm aerogel beads.

Examination of the operating parameters listed in Table 2 identifies at least one limitations of prior art devices, for example, the device of Plawsky, et al. (2003), in comparison to aspects of the present invention. According to aspects of the invention, the pressure at the inlet of the draft tube, and thus the pressure drop across the draft tube, is not a function of the draft tube flow velocity, Ud, but of the flow of fluid out of outlet 518, that is, $F_3$. According to the present invention, the pressure drop across the draft tube 520, that is, $\Delta P_D$, can be decreased to about 96.2 Pa, independent of the pressure drop across the annulus. This can be achieved according to aspects of the invention by regulating the flow out of the vessel through valve 527, that is, $F_3$ or by regulating the pressure in vessel 540 via pressure control device 552. However, in order to achieve this low pressure in the prior art device of Plawsky, et al. (2003), the particulate material height $H_a$ would have to be reduced to impractical levels, for example, $H_a$ would have to be about 0.133 meters, that is, about 5 inches, a height that would be difficult to maintain while maintaining the proper operation of the draft tube. Aspects of the present invention overcome this problem by not requiring the pressure drop across the draft tube to be equal to the pressure drop across the particulate material in the annulus about tube 520.

Figure 8:
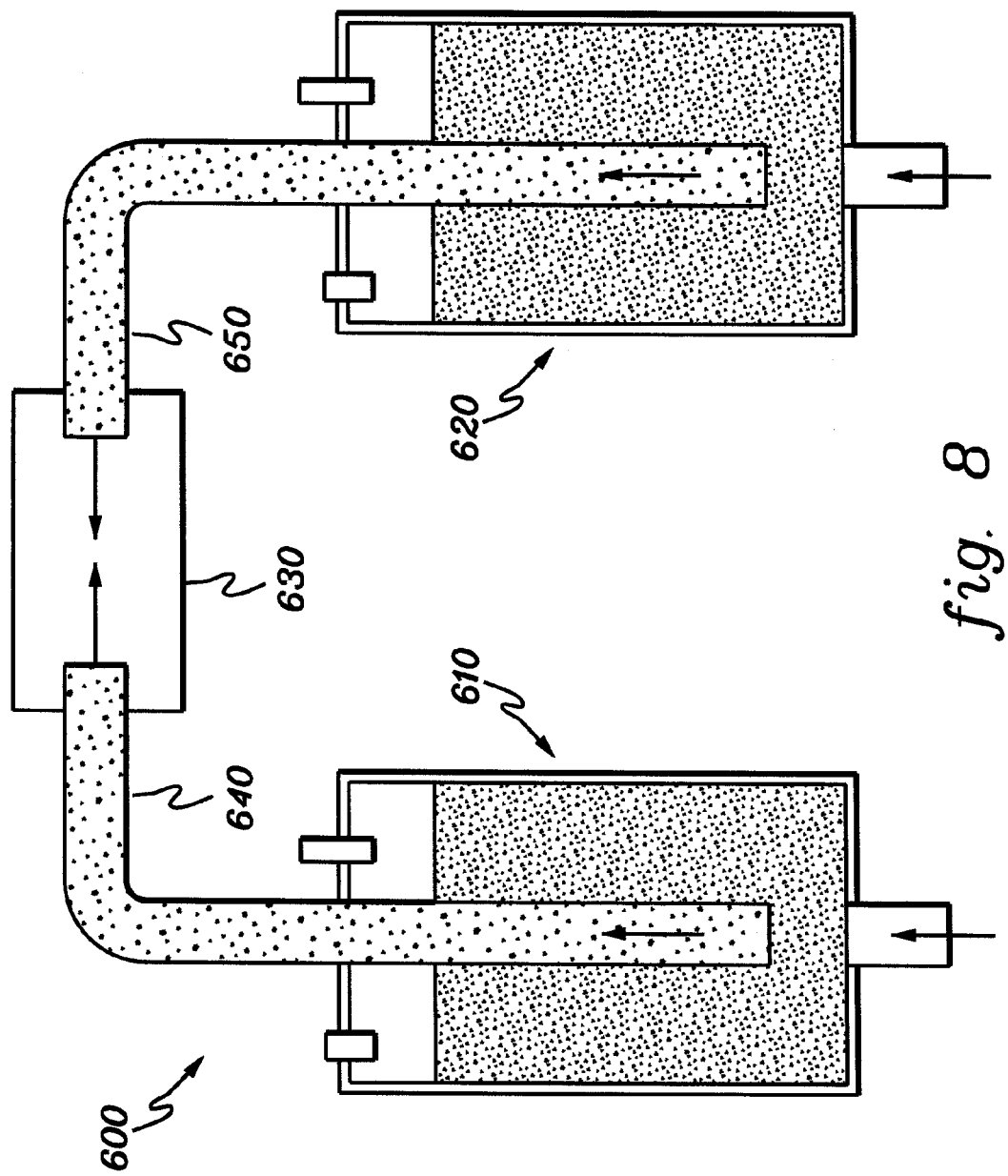
FIG. 8 is a schematic diagram of a particle handling system having a plurality of particulate treatment apparatus feeding a collection vessel according to another aspect of the invention.

FIG. 8 is a schematic diagram of a particle mixing system 600 having a plurality of particulate feeders 610 and 620 and a collection vessel 630 according to another aspect of the invention. Feeders 610 and 620 may be similar to apparatus 10, 110, 300, and 510 described above. Vessel 630 may be similar to apparatus 400 and 530 described above. According to this aspect of the invention, the plurality of feeders 610 and 620 (or more) include tubes 640 and 650, respectively, that are directed into common vessel 630 whereby the fluid streams discharged by tubes 640 and 650 are directed against each other to enhance mixing and the disruption of clumps. In one aspect, the streams may be directed against a common surface, for example, upon the opposite sides of a common plate.

TABLE 2

Typical Operating Parameters of the System Shown in FIG. 7

| Parameter | Value | Notes |
|---|---|---|
| Solids fraction, $(1 - \epsilon_d)$ | 1% be weight | $\epsilon_d$ = Voidage; specified |
| $Q_1 + Q_2$ | 767.5 L/min | Specified; where $Q_n$ is volumetric flow rate and $F_n$ is a mass flow rate; thus, $F_n = \rho Q_n$ |
| $Q_{SPRAY}$ | 58.0 L/min | Flow of spray coating to inlet; specified |
| $Q_3$ | 27.5 L/min | Calculated from Equation 1 |
| Inside diameter of draft tube 520, $D_d$ | 41.15 mm | Specified |
| Outside diameter of draft tube 520, $D_o$ | 44.45 mm | Specified |
| Inside diameter of vessel, D | 149.1 mm | Specified |
| Inlet spacing, $L_t$ | 25.4 mm | See 321 in FIG. 4; specified |
| Particle Diameter | 1 mm | Aerogel particles; specified |
| Particle Density | 140 kg/m³ | Specified |
| Height of particulate material, $H_a$ | 0.526 meters | Specified |
| Annulus Voidage | 0.42 | Specified |
| Length of draft tube 520, $L_d$ | 2 meters | Specified |
| Pressure Drop across draft tube 520, $\Delta P_d$ | 96.2 Pascals | A function of $U_d$ and $(1 - \epsilon_d)$ |
| Pressure Drop across annulus, $\Delta P_a$ | 265.7 Pascals | Assuming a packed bed. |
| Flow through draft tube 520, $Q_t$ | 798.0 L/min | |
| Fluid velocity in draft tube 520, $U_d$ | 10 m/s | |

In one aspect, system 600 may also be used as a particle grinder to grind particles to finer sizes as needed.

According to aspects of the present invention, a new and improved draft-tube, spout-fluid bed handling apparatus, mixing apparatus, treating apparatus, and/or reactor is provided for particulate material. The treating apparatus and reactor provide novel means of processing reagents in a counter-current fashion that enhances efficacy while minimizing the undesirable mixing of reagents. The mixing aspect of the invention provides improved uniformity of product that characterize high shear rotary mixing while providing improved dispersion of the mixed components. With such improved mixing and dispersion of particles improved mixtures, for example, improved mortars of acceptable compressive strength and improved pharmaceuticals can be produced. Aspects of the invention also provide an improved reactor and method of reacting and treating particulate material, for example, for petrochemical processing and biochemical processing.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A particulate material handling apparatus comprising:
   a vessel having a top and a bottom;
   a vertically extending conduit having an inlet in the vessel and an outlet;
   a fluid inlet in the bottom of the vessel, the fluid inlet directed toward the inlet of the vertically extending conduit wherein a pressurized fluid introduced there through produces a flow of at least some particulate material from the vessel and fluid through the vertically extending conduit;
   a fluid outlet from the vessel; and
   a control system that regulates
      flow of fluid through the fluid inlet,
      flow of fluid through the fluid outlet, and
      pressure drop across at least a portion of the vertically extending conduit to independently control particle velocity and solids fraction of flow through the vertically extending conduit.

2. The apparatus as recited in claim 1, wherein the control system regulates at least one restriction positioned in one of the vertically extending conduit and down stream of the vertically extending conduit.

3. The apparatus as recited in claim 1, wherein the fluid inlet comprises a first fluid inlet, and wherein the device further comprises at least one second fluid inlet.

4. The apparatus as recited in claim 3, wherein the at least one second fluid inlet comprises a fluid reactant inlet operatively connected to a source of fluid reactant that reacts with at least some of the particulate material.

5. The apparatus as recited in claim 1, wherein the fluid inlet in the bottom of the vessel produces a flow of a plurality of particulate materials from the vessel through the vertically extending conduit to mix the plurality of particulate materials.

6. The apparatus as recited in claim 5, wherein the plurality of particulate materials to be mixed comprise sand and cement.

7. The apparatus as recited in claim 1, wherein the fluid inlet comprises a fluid reactant inlet operatively connected to a source of fluid reactant that reacts with at least some of the particulate material.

8. The apparatus as recited in claim 7, wherein the fluid reactant reacts with at least some of the particulate material flowing through the vertically extending conduit.

9. The apparatus as recited in claim 1, wherein the fluid inlet comprises a treatment fluid inlet operatively connected to a source of treatment fluid that treats at least some of the particulate material.

10. The apparatus as recited in claim 1, wherein the bottom of the vessel comprises a conical head having an apex and converging sides, and wherein the fluid inlet is positioned at the apex of the conical head.

11. The apparatus as recited in claim 10, wherein the fluid inlet positioned at the apex of the conical head comprises a first fluid inlet, and wherein the apparatus further comprises at least one second fluid inlet directed through the converging sides of the conical head.

12. The apparatus as recited in claim 1, wherein the vessel comprises a first vessel, and wherein the apparatus further comprises a second vessel positioned to receive the flow of particulate material and fluid from the vertically extending conduit, the second vessel having a top and a bottom.

13. The apparatus as recited in claim 12, wherein the apparatus further comprises a conduit for transferring particulate material from the second vessel to the first vessel.

14. The apparatus as recited in claim 12, wherein the apparatus further comprises an impaction surface located in the second vessel and positioned to be impinged by the flow of particulate material and fluid from the vertically extending conduit to promote mixing of the particulate material.

15. The apparatus as recited in claim 14, wherein the means for collecting at least some of the fine particulate material comprises a filtering medium.

16. The apparatus as recited in claim 15, wherein the filtering medium comprises at least one bag filter positioned in the second vessel.

17. The apparatus as recited in claim 12, wherein at least some fine particulate material is produced in the second vessel, and wherein the device further comprises means for collecting at least some of the fine particulate material.

18. The apparatus as recited in claim 1, wherein the control system further regulates fluid flow velocity through the vertically extending conduit.

19. The apparatus as recited in claim 1, wherein the fluid inlet comprises a coating fluid inlet operatively connected to a source of coating fluid that coats at least some of the particulate material.

20. The apparatus as recited in claim 19, wherein the particulate material comprises an aerogel.

21. The apparatus as recited in claim 1, wherein the vertically extending conduit and the vessel provide an annular region between the outside of the conduit and the inside of the vessel, wherein the particulate material is positioned in the annular region.

22. The apparatus as recited in claim 21, wherein the pressurized fluid introduced through the fluid inlet produces a flow of at least some of fluid upward through the particulate material in the annular region.

23. The apparatus as recited in claim 22, wherein the control system further regulates upward flow of fluid through the particulate material in the annular region.

24. The apparatus as recited in claim 23, wherein the control system regulates a flow control valve positioned in a flow outlet of the vessel.

25. The apparatus as recited in claim 21, wherein the pressurized fluid introduced through the fluid inlet comprises a reactant adapted to react with the particulate material in the annular region.

26. The apparatus as recited in claim 1, wherein the control system independently varies particle velocity and solids fraction of flow through the vertically extending conduit.

* * * * *